(12) United States Patent
Smith et al.

(10) Patent No.: US 12,741,387 B2
(45) Date of Patent: Sep. 22, 2026

(54) SUCTION ASSIST MULTI-FUNCTIONAL ROBOTIC END EFFECTOR

(71) Applicant: Palladyne Corp., Salt Lake City, UT (US)

(72) Inventors: Fraser M. Smith, Salt Lake City, UT (US); Matthew Torok, Cary, NC (US)

(73) Assignee: Palladyne Corp., Salt Lake City, UT (US)

( * ) Notice: Subject to any disclaimer, the term of this patent is extended or adjusted under 35 U.S.C. 154(b) by 0 days.

(21) Appl. No.: 19/412,432

(22) Filed: Dec. 8, 2025

(65) Prior Publication Data

US 2026/0158679 A1 Jun. 11, 2026

Related U.S. Application Data

(60) Provisional application No. 63/728,949, filed on Dec. 6, 2024.

(51) Int. Cl.
*B25J 15/06* (2006.01)
*B25J 15/10* (2006.01)

(52) U.S. Cl.
CPC ....... *B25J 15/0616* (2013.01); *B25J 15/0608* (2013.01); *B25J 15/103* (2013.01)

(58) Field of Classification Search
CPC ... B25J 15/0616; B25J 15/0608; B25J 15/103
See application file for complete search history.

(56) References Cited

U.S. PATENT DOCUMENTS 4,723,353 A * 2/1988 Monforte ............. B25J 15/0052 414/737
4,858,974 A * 8/1989 Stannek ............... B25J 15/0616 294/902
8,414,042 B2 * 4/2013 Landes .................. B65G 47/90 294/67.31
10,702,994 B1 * 7/2020 Jonas .................. B25J 15/0616
(Continued)

FOREIGN PATENT DOCUMENTS

CN 106112999 A 11/2016
CN 118418179 A 8/2024
(Continued)

*Primary Examiner* — Stephen A Vu
(74) *Attorney, Agent, or Firm* — Thorpe North & Western, LLP

(57) ABSTRACT

A multi-functional robotic end-effector, the method comprising a support platform, a gripper assembly supported from the support platform, and a negative pressure system to be supported, at least in part, from the support platform. The gripper assembly can comprise an opposable gripper arrangement having first and second grippers, at least one of the first or second grippers being actuatable in at least one degree of freedom. The negative pressure system can comprise a suction asset having an object interfacing component comprising an interfacing surface that defines a suction plane, the negative pressure system facilitating a negative pressure within the suction asset. The suction asset can be supported by one of the support platform or the gripper assembly, and can be positioned within a gripping region of the gripper assembly, or alternatively, the suction asset can be positioned outside of the gripping region of the gripper assembly.

42 Claims, 19 Drawing Sheets

(56) References Cited

U.S. PATENT DOCUMENTS 10,858,188 B2 * 12/2020 Fujihara ............... B25J 15/0061
10,864,641 B2 * 12/2020 Leidenfrost ............ B25J 15/106
2022/0203554 A1 6/2022 Abe et al.

FOREIGN PATENT DOCUMENTS

KR 20230174484 A 12/2023
WO 2023138741 A1 7/2023

* cited by examiner

SUCTION ASSIST MULTI-FUNCTIONAL ROBOTIC END EFFECTOR

RELATED APPLICATIONS

This application claims the benefit of U.S. Provisional Ser. No. 63/728,949, filed Dec. 6, 2024, and entitled, "Suction Assist Multi-Functional Robotic End Effector," which is incorporated by reference herein in its entirety.

BACKGROUND

Robotic hands or grippers have been developed for different activities or anticipated usage. For example, magnetic grippers have been developed for ferromagnetic objects, such as sheet metal. Similarly, fingered grippers have been developed for other objects, such as tools. Magnetic grippers cannot effectively grasp tools, while fingered grippers cannot effectively handle some objects, like sheet metal. The development of robotic hands or grippers is an ongoing endeavor.

SUMMARY

An initial overview of the inventive concepts is provided below and then specific examples are described in further detail later. This initial summary is intended to aid readers in understanding the examples of the present technology more quickly, but is not intended to identify key features or essential features of the examples, nor is it intended to limit the scope of the present technology or the claimed subject matter.

Disclosed herein is a multi-function robotic end-effector with multiple different types of assets to more efficiently manipulate, handle and/or grasp different types of workpieces or objects without having to change end-effectors or robots. In one example, a multi-function robotic end-effector can comprise a gripper assembly and a negative pressure system comprising a negative pressure generator and one or more suction assets. In this example, the multi-function robotic end-effector can handle or grasp ordinary objects that fit within its gripper assembly. In addition, the multi-function robotic end-effector can handle or grasp those objects that do not fit within the gripper assembly, or that are not easily grasped by the gripper assembly, but that comprise a surface to which a negative pressure can be applied via the one or more suction assets to assist in grasping and lifting the object. Thus, the multi-function robotic end-effector can be used to grasp objects with its gripper assembly, as well as utilize suction properties of the suction assets operable within the multi-function robotic end-effector to assist in gripping or grasping objects to which a negative pressure can be applied. In another example, a multi-function robotic end-effector can comprise a gripper assembly, a negative pressure system comprising one or more negative pressure generators and one or more suction assets, and a functional asset comprising magnetic properties, such as one or more magnets or magnet systems/mechanisms. In this example, the multi-function robotic end-effector can handle or grasp ordinary objects that fit within its gripper assembly. In addition, the multi-function robotic end-effector can handle or grasp those objects that do not fit within the gripper assembly, or that are not easily grasped by the gripper assembly, but that comprise a surface to which a negative pressure can be applied via the one or more suction assets to assist in grasping and lifting the object. Still further, the multi-function robotic end-effector can handle or grasp objects comprising a material having a magnetic property, or that is magnetically attracted to a magnet. Thus, the multi-function robotic end-effector can be used to grasp objects with its gripper assembly, or the multi-function robotic end-effector can utilize suction properties to assist in gripping or grasping objects to which a negative pressure can be applied, or the multi-function robotic end-effector can utilize magnetic properties to assist in gripping or grasping objects that are attracted to magnets. In each of these examples, any one or all of the different types of assets can be deployed to handle, grasp, or otherwise manipulate an object or objects. Stated differently, the gripper assembly, the negative pressure or suction asset, and, if present, the magnet, can be used simultaneously or separate from one another depending upon the object or objects to be grasped and manipulated.

The multi-function robotic end-effector can comprise a support platform comprising one or more structural supports and associated surfaces, such as a palm, in support of at least one of the gripper assembly, the suction assets, or the magnet. The multi-function robotic end-effector can further comprise a robotic arm interface, such as a coupler, that facilitates mechanical attachment of the multi-function robotic end-effector to a robotic arm or robot. In one aspect, the robotic arm interface can be articulated such that the support platform can pivot or rotate about the robotic arm interface, and thus the robotic arm. In another aspect, the robotic arm interface can also comprise at least one of electrical or fluid interfaces, such as electrical (e.g., data, power, etc.), fluid (e.g., pneumatic, hydraulic). These can comprise electrical wires and connectors, fluid lines and connectors or couplings, and any other components needed to operate the end-effector. The multi-function robotic end-effector can further comprise one or more types of sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
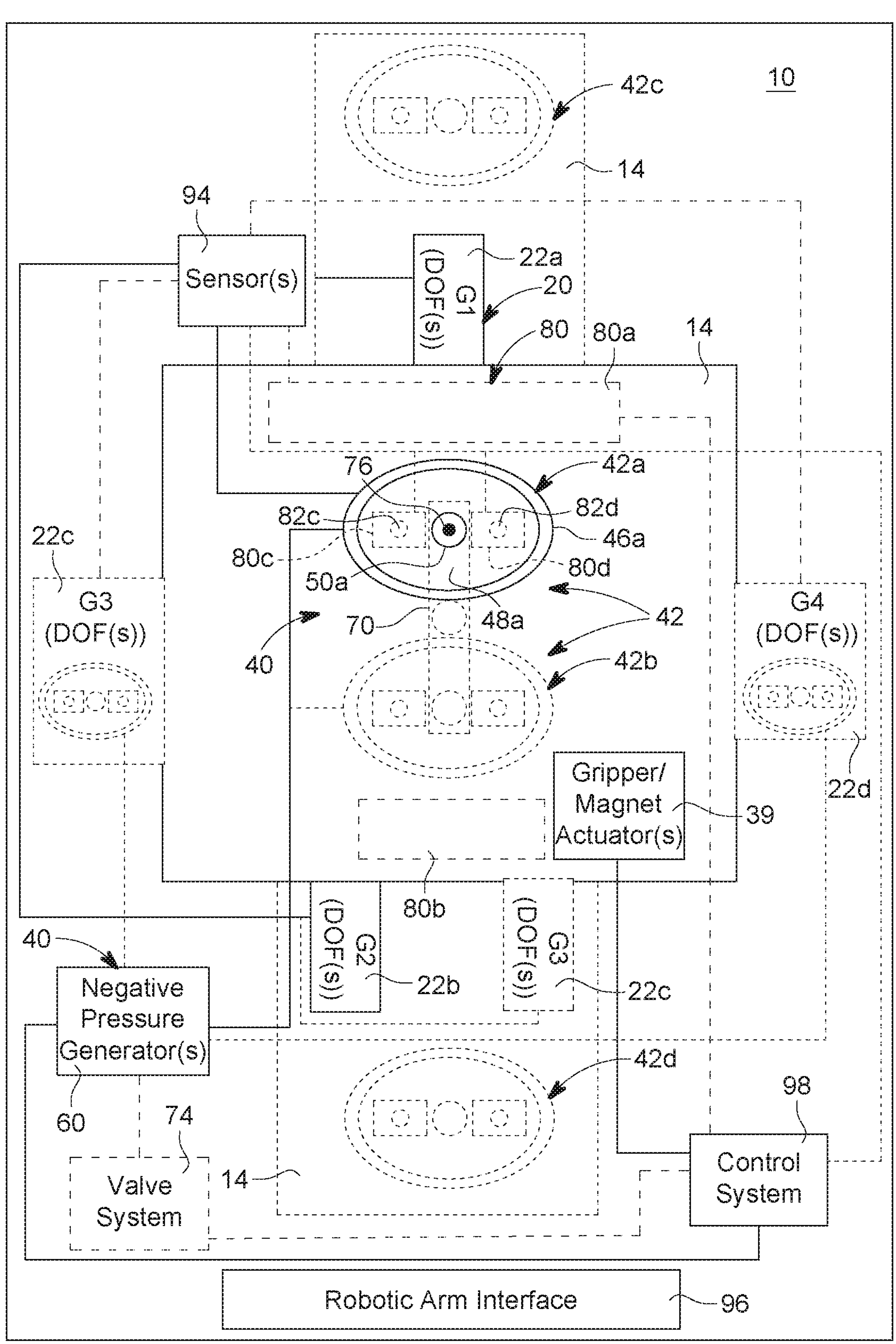
FIG. 1 illustrates a general block or schematic diagram of a multi-function robotic end-effector in accordance with various examples, and shown with the suction assets within a gripping region of the gripper assembly.

Reference will now be made to the examples illustrated, and specific language will be used herein to describe the same. It will nevertheless be understood that no limitation of scope is thereby intended.

DETAILED DESCRIPTION

The following detailed description of exemplary embodiments of the present technology refers to the accompanying drawings, which form a part hereof and in which are shown, by way of illustration, examples in which the present technology may be practiced. While these exemplary embodiments are described in sufficient detail to enable those skilled in the art to practice the present technology, it should be understood that other embodiments may be realized and that various changes to the present technology may be made without departing from the spirit and scope of the present technology. Thus, the following more detailed description of the embodiments of the present technology is not intended to limit the scope of the invention, as claimed, but is presented for purposes of illustration only to describe the features and characteristics of the present technology, and to sufficiently enable one skilled in the art to practice the invention.

Description of Terms

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected or contiguous. Such elements may also be proximate or near or close to each other without necessarily contacting each other. The exact degree of proximity may in some cases depend on the specific context.

As used herein, the term "multi-functional robotic end-effector" refers to a single robotic end-effector having multiple different types of grasping, gripping or lifting components or systems, each of which can be referred to herein as a "functional asset," that can be selected and used or deployed to at least two of grasp, grip, lift or otherwise secure or move an object or objects. The different types of functional assets can be selected and used independently of one another, or they can be selectively used in any combination one with one another. As disclosed herein, a "functional asset" can refer to a gripper assembly, a negative pressure system, or a magnet/magnet system.

As used herein, "ferromagnetic" refers to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic object is attracted to magnets, such as by containing iron, or is a magnet or is magnetic, such as a permanent magnet.

As used herein, "magnetic" refers to a material or element that has magnetic properties either inherently, such as with a permanent magnet, or induced, such as with an electromagnet or a variable flux magnet. As such, the term "magnet" can refer to a magnet having inherent magnetic properties (e.g., a permanent magnet), or it can refer to a magnet system or mechanism in which the magnetic properties are induced and/or selectively produced, such as with a permanent magnet with a variable flux path, a variable strength magnet system, or an electromagnet in which a magnetic field is induced and variable in response to the application of an electric current. In the case of a permanent magnet with a variable flux path, or a magnet system or mechanism, the magnetic field can be variable and selectively adjustable from no magnetic field to one sufficiently large to enable successful acquisition of an object (e.g., a ferromagnetic object).

The term "opposable gripper arrangement" refers to an arrangement of grippers within the gripper assembly comprising at least first and second grippers that oppose one another in the sense that opposing forces are applied to an object by one or more grippers. Opposable gripper arrangements comprising more than two grippers are contemplated. In one example, an opposable gripper arrangement can comprise a parallel-jaw gripper arrangement, wherein the grippers remain parallel throughout the gripper's opening and closing movements (i.e., its range of motion).

The term "gripping region" refers to an envelope or boundary of the opposable grippers of the opposable gripper arrangement of the gripper assembly throughout their range of motion in which they are able to act upon on object. The gripping region can increase or decrease depending upon the position of the opposable grippers within their range of motion. The gripping region is defined in part by the respective opposing inner surfaces of the grippers of the opposable gripper arrangement. For an example of a gripping region see FIGS. 3, 8 and 9.

The term "negative pressure manipulation configuration" refers to a multi-functional robotic end-effector in a configuration with the negative pressure system active and operable to effect, at least in part, manipulation of an object via a negative pressure interface.

The term "mechanical grip configuration" refers to a multi-functional robotic end-effector in a configuration with the gripper assembly active and operable to effect, at least in part, grasping or lifting and manipulation of an object via a mechanical interface.

The term "magnetic manipulation configuration" refers to a multi-functional robotic end-effector in a configuration with the magnet or magnet system active and operable to effect, at least in part, grasping or lifting and manipulation of an object via a magnetic interface.

The term "negative pressure configuration" refers to a multi-functional robotic end-effector in a configuration with the negative pressure system active and operable to effect, at least in part, grasping or lifting and manipulation of an object via application of a negative pressure.

The term "suction plane" refers to a plane defined by a suction asset at the outermost surface of the suction asset that interfaces with an object, the suction plane extending in all directions.

Examples of the Technology

To further describe the present technology, example embodiments are now set forth and described with reference to the figures. These example embodiments are not intended to be limiting in any way. With reference to FIG. 1, illustrated is a schematic diagram of a multi-functional robotic end-effector in accordance with an example of the present disclosure. Depending upon the configuration of the multi-functional robotic end-effector, any one or all of the different grasping, gripping or lifting types can be present and selectively deployed. As such, the multi-functional robotic end-effector can also be referred to as a hybrid end-effector. As shown, the multi-functional robotic end-effector 10 can comprise a support platform 14 configured to provide structural support to the other components, elements, etc. of the end-effector 10, and particularly the functional assets, such as at least one of a gripper assembly, one or more components of a negative pressure system, and, if present, a magnet or magnet system, as discussed below. The support platform 14 can comprise any number of different configurations, be made of a number of different materials, and can comprise a variety of functions. In one example, the support platform 14 can comprise a structural surface situated between two or more opposable grippers, wherein the surface comprises an engagement or interfacing surface that functions similar to a palm of a human hand, and thus can be referred to as a palm. The support platform 14 can comprise a monolithic or block-like structure, a housing having an interior volume, a frame or frame-like configuration, or any other structural design or configuration. The support platform 14 can be made of any material or combination of materials, such as metal, carbon-fiber, polymer, or others. Moreover, the support platform 14 can comprise various interfaces, mounts, apertures, lumens, or other features to facilitate the functionality of the end-effector 10, and any of the components supported on or by the support platform 14.

The multi-functional robotic end-effector 10 can further comprise a functional asset in the form of a gripper assembly 20 comprising an opposable gripper arrangement supported by the support platform 14 and having at least opposing first and second grippers (e.g., see first gripper 22*a* (G1) and second gripper 22*b* (G2)) that are moveably supported by the support platform 14, at least one of the first or second grippers 22*a*, 22*b* being actuatable in at least one degree of freedom. The multi-functional robotic end-effector 10 can comprise a number of different opposable gripper arrangements. In one example, an opposable gripper arrangement can comprise a two gripper arrangement with first and second grippers that oppose one another (e.g., see grippers 22*a* (G1) and 22*b* (G2)). In another example, an opposable gripper arrangement can comprise a three gripper arrangement (e.g., see grippers 22*a* (G1), 22*b* (G2) and 22*c* (G3) in dotted lines). In one aspect, the three gripper arrangement can comprise a first gripper being opposable to second and third grippers (e.g., see first gripper 22*a* (G1) opposable to second gripper 22*b* (G2) and third gripper 22*c* (G3) in dotted lines). In another aspect, the three gripper arrangement can comprise three grippers that oppose one another, such as three grippers that are spaced and equidistance from one another (e.g., first, second and third grippers 22*a* (G1), 22*b* (G2) and 22*c* (G3) in dotted lines can all be supported about the support platform 14 at an equidistance from one another). In still another example, an opposable gripper arrangement can comprise a four gripper arrangement (e.g., see first, second, third, and fourth grippers 22*a* (G1), 22*b* (G2), 22*c* (G3) in dotted lines, and 22*d* (G4) in dotted lines, respectively). In one aspect, the four gripper arrangement can comprise the first gripper 22*a* being opposable to second, third and fourth grippers 22*b*, 22*c*, and 22*d*, respectively. In another aspect, the four gripper arrangement can comprise first and second grippers 22*a*, 22*b* that oppose one another, and third and fourth grippers 22*c*, 22*d* that oppose one another. It is noted that the opposable gripper arrangements discussed above are not meant to be limiting in any way. Indeed, those skilled in the art will recognize that other gripper arrangements are possible and that can be implemented.

The gripper assembly can further comprise one or more actuators operable to actuate the grippers of the gripper assembly. The one or more actuators within the gripper assembly is represented by actuator 39. In one example, a single actuator can be used to actuate multiple grippers, such as first and second opposable grippers 22*a* (G1) and 22*b* (G2). In another example, each gripper can itself comprise one more actuators. In an example, any one or more of the grippers 22*a*, 22*b*, 22*c*, and 22*d* can be rotatably supported by the support platform 14, and can each comprise one or more joints facilitating movement of the respective grippers in one or more degrees of freedom. In an example, a gripper can comprise an actuator operable to actuate each respective joint and degree of freedom of the gripper. In another example, a gripper can be configured to comprise an actuator operable to actuate multiple joints and multiple corresponding degrees of freedom of the gripper (i.e., an underactuated gripper). In an example, one or more opposable grippers can be linearly supported by the support platform 14, such that the one or more grippers moves linearly along an axis relative to the support platform 14.

The multi-functional robotic end-effector 10 can further comprise a functional asset in the form of a negative pressure system 40 supported, at least in part, by the support platform 14, the negative pressure system 40 being operable to facilitate a negative pressure within one or more suction assets (e.g., suction cups, multi-piece suction elements) for grasping and manipulating an object or objects using a negative pressure applied to the object or objects.

The negative pressure system 40 can comprise one or more suction assets (e.g., see first suction asset 42*a* and second suction asset 42*b* in dotted lines intending to convey that the end-effector 10 can comprise a single suction asset, or a plurality of suction assets) (e.g., suction cups) operable to interface with an object or objects to grasp and manipulate the object(s) via a negative pressure. The one or more suction assets can be supported from (i.e., supported either directly by/on, or indirectly through one or more other components) the support platform 14. The term "supported from" as used herein is intended to refer to either direct or indirect support of a feature or element of the end-effector 10 (e.g., a suction asset) by another feature or element of the end-effector 10 (e.g., the support platform 14). In one example, the one or more suction assets can be supported directly by the support platform 14, thus being supported "from" the support platform 14. In another example, the one or more suction assets can be supported indirectly by the support platform 14, such as a suction asset that is supported on a gripper of the gripping assembly 20, which is itself is supported from the support platform 14, thus the suction asset is supported indirectly by the support platform 14 via the gripper of the gripper assembly 20. Indeed, the one or more suction assets can be supported from (i.e., supported either directly by/on, or indirectly by/on through one or more other components) a gripper (e.g., see suction assets shown in dotted lines as supported from third and fourth grippers 22*c* (G3) and 22*d* (G4)) while still being supported "from" the support platform 14. In still another example, a plurality of suction assets can be supported by both the support platform 14 and a gripper or grippers of the gripper assembly 20, each of these thus being supported "from" the support platform 14. In any of these example, the one or more suction assets can be supported at a position so as to be proximate the opposable gripper arrangement of the gripper assembly 20. The one or more suction assets can be selectively deployed to engage or interface with an object or objects to be grasped and manipulated by the end-effector 10 using negative pressure.

The one or more suction assets can be located at any position on the end-effector 10, and relative to the gripper assembly 20. In one example, the one or more suction assets can be supported from the support platform 14 at a position so as to be between opposable grippers of the gripper assembly 20 making up, at least in part, the opposable gripper arrangement, such as between the first and second grippers 22*a* (G1) and 22*b* (G2) of the gripper assembly 20, or between opposable grippers 22*a* (G1) and 22*b* (G2) and also between opposable grippers 22*c* (G3) and 22*d* (G4) of the gripper assembly 20, such that the one or more suction assets are operable within a gripping region of the opposable gripper arrangement. In some aspects, the one or more suction assets can extend from a lowermost surface of the support platform 14. In another example, the one or more suction assets can be supported from the support platform 14 at a position or positions so as to be proximate opposable grippers of the gripper assembly 20, such as proximate any of the first, second, third or fourth grippers 22*a*, 22*b*, 22*c*, 22*d*, respectively, of the opposable gripper arrangement of the gripper assembly 20, yet with the one or more suction assets being located outside or offset from, and operable outside of, a gripping region of the opposable gripper arrangement of the gripper assembly 20. For example, suction assets 42*c* and 42*d* are shown in dotted lines as being directly or indirectly supported from a portion of the support platform 14 also shown in dotted lines. It is noted that the suction assets 42*c* and 42*d* can be directly supported from the support platform 14 (e.g., directly from a structural portion of the platform capable of locating the suction assets outside or offset from the gripping region of the opposable gripper arrangement), or indirectly supported from the platform 14 (e.g., from a portion of one or more grippers capable of locating the suction assets outside or offset from the gripping region of the opposable gripper arrangement). In still another example, the one or more suction assets can be supported from a gripper or grippers of the gripper assembly 20, such as on at least one of the first, second, third or fourth grippers 22*a*, 22*b*, 22*c*, 22*d*, respectively, of the opposable gripper arrangement of the gripper assembly, such that the one or more suction assets extend from a surface of the respective gripper and are operable within a gripping region of the opposable gripper arrangement of the gripper assembly 20. In still another example, the one or more suction assets can be supported from a gripper or grippers of the gripper assembly 20, such as on at least one of the first, second, third or fourth grippers 22*a*, 22*b*, 22*c*, 22*d*, respectively, of the opposable gripper arrangement of the gripper assembly 20, such that the one or more suction assets are operable outside of a gripping region of the opposable gripper arrangement.

The one or more suction assets can comprise a number of different configurations and designs. The suction assets can each comprise an object interfacing component (e.g., see object interfacing component 46*a* of suction asset 42*a*) comprising an interfacing surface (e.g., an outer surface). The object interfacing component can define, at least in part, an interior volume of the suction asset (e.g., see interior volume 48*a* of suction asset 42*a*) in fluid communication with a negative pressure generator (negative pressure generators being discussed below). The object interfacing component can be designed and configured to interface with (i.e., come into contact with or against) an object to form a seal or a partial seal against a surface of the object, such that a negative pressure, once induced, can operate to secure the object to the end-effector 10 via the suction asset. The interfacing surface(s) of the one more suction assets can define a suction plane. In one example, the object interfacing component can be directly coupled to or otherwise supported by the support platform. In another example, the object interfacing component can be indirectly coupled to or otherwise supported by the support platform, such as via a load bearing component or assembly in support of the object interfacing component, and that itself is coupled directly to the support platform, to a gripper or gripper assembly.

In one example, the one or more suction assets can comprise a multi-piece suction element comprising an object interfacing component (comprising an interfacing surface), with the suction element further comprising a load bearing component in support of the object interfacing component, these defining an interior volume. The load bearing component can comprise any structural object, body, element, configuration, framework, base, or assembly capable of supporting the object interfacing component, and capable of bearing the forces or loads applied between the object and the suction element under a needed or desired negative pressure sufficient to grasp and/or manipulate an object. In one example, the object interfacing component of the one or more suction elements can comprise a compliant component with a compliant material makeup, such as a compliant skirt or compliant bellows, defining or comprising the interfacing surface that interfaces with an object. This can be coupled to or otherwise supported by the load bearing component, and the multi-piece section element can be coupled to or otherwise supported by the support platform (or the gripper assembly). An outer surface of the compliant skirt or bellows of the suction element can comprise the interfacing surface, and the corresponding suction plane. Due to its compliant nature, the compliant object interfacing component (e.g., the compliant skirt or bellows) can elastically deform under an applied load. As such, the suction plane defined by these can be changeable or moveable upon the suction element coming into contact with an object, wherein forces acting between the suction element and the object are introduced. If such forces are sufficient to deform or displace the compliant skirt or bellows in one or more degrees of freedom (e.g., deforming or displacing the compliant skirt along one or more rotational and/or translational axes), the interfacing surface can likewise rotate, change elevation, translate, or any combination of these, thus altering or changing the suction plane as limited by the load bearing component.

In another example, the one or more suction assets can comprise of be in the form of a suction cup made of a compliant material comprising the object interfacing component, which comprises an interfacing surface intended to interface with and seal against an object. Indeed, the object interfacing component can be designed and configured to interface with (i.e., come into contact with or against) an object to form a seal or a partial seal against a surface of the object, such that a negative pressure, once induced, can operate to secure the object to the end-effector 10 via the suction cup. The interfacing surface of the one more suction cups can define a suction plane. In one aspect, the one or more suction cups can comprise a bellows configuration. An outer surface of the suction cup can comprise the interfacing surface, and the corresponding suction plane. Due to its compliant nature, the compliant object interfacing component can elastically deform under an applied load. As such, the suction plane defined by these can be changeable or moveable upon the suction cup coming into contact with an object, wherein forces acting between the suction cup and the object are introduced. If such forces are sufficient to deform or displace the compliant suction cup in one or more degrees of freedom (e.g., deforming or displacing the compliant suction cup along one or more rotational and/or translational axes), the interfacing surface can likewise rotate, change elevation, translate, or any combination of these, thus altering or changing the suction plane. The suction cup can further comprise or be operable with a load bearing component (e.g., a fitting or nipple) in support of the compliant material (object interfacing component) of the suction cup.

Suction assets intended to be used with the end-effector 10 can comprise any type, configuration, size. One skilled in the art will recognize and appreciate that the end-effector 10, and specifically the negative pressure system 40, can comprise any type or configuration of suction asset(s) needed or desired although such are not specifically described herein. For example, the type and configuration of suction asset can depend upon the object or objects to be grasped and manipulated using a negative pressure. As such, suction assets comprising a suction element or a suction cup as discussed above are not intended to be limiting in any way.

The one or more suction assets can further comprise a fluid passageway (e.g., see fluid passageway 50*a* of suction asset 42*a*) extending from an outer surface or portion of the suction asset to an interior volume of the suction asset defined by the interior surfaces of the suction asset (e.g., the object interfacing component and the load bearing component of a multi-piece suction element, or the interior surface of a suction cup). The fluid passageway facilitates airflow out of or through the suction asset from the interior volume under the influence of a negative pressure as applied by the negative pressure generator to facilitate a suction, as discussed below. The negative pressure system 40 can further comprise any arrangement of connectors or couplings operable to connect the fluid passageway and the one or more suction assets to the negative pressure generator, such as to connect respective vacuum lines or channels extending between the one or more suction assets and a negative pressure generator.

In some examples, the negative pressure system 40 can further comprise a mount operable to facilitate mounting of the one or more suction assets to the support platform 14, or to another component of the end-effector 10. The mount can be part of the support platform 14, or it can comprise a separate structure. One or more fasteners can be used to mount the one or more suction assets to the mount, and one or more fasteners can be used to secure the mount to the support platform 14 or another component of the end-effector 10. The mount can comprise any structural configuration, and can comprise a through hole, such as for facilitating a vacuum line to extend therethrough. In one example, the through hole can be in fluid communication with the fluid passageway of the one or more suction assets. In another example, the through hole can receive and support an extended or protruding portion of a suction asset, a coupling connecting the suction asset to a vacuum line, or any combination of these. In any case, the through hole can facilitate support of the suction asset, as well as the fluid communication of the suction asset with the negative pressure generator.

The one or more suction assets can be mounted in a number of different ways and to a number of different components of the end-effector 10. In one example, the suction asset(s) can be mounted (i.e., one of directly or indirectly (e.g., via a mount)) to the support platform 14. In one aspect, the suction asset(s) can be fixedly mounted to the support platform 14 such that their position is fixed relative to the support platform 14. In another aspect, the suction asset(s) can be moveably mounted to the support platform 14, such that the one or more suction assets can be caused to move or displace relative to the support platform 14. Indeed, in one aspect, the one or more suction assets can be rotatably mounted to the support platform 14, such that they are moveable in at least one rotational degree of freedom, and in some cases two or three, relative to the support platform 14, thus being able to be positioned to interface with objects that are misaligned relative to the support platform 14. In another aspect, the one or more suction assets can be slidably or translationally mounted to the support platform 14, such that they are moveable in at least one translational degree of freedom relative to the support platform 14.

The one or more suction assets can be mounted such that the suction plane defined by the one or more suction assets is located in a different elevation than a lowermost surface of the opposable grippers of the gripper assembly 20 when the opposable grippers are retracted and out of the way of an object to be interfaced with. In other words, the opposable grippers of the gripper assembly 20 can be configured with a sufficient range of motion so as to be able to place them in a retracted position away from (e.g., behind or above depending upon the orientation of the end-effector 10) the suction plane of the one or more suction assets, thus permitting the suction assets to operate without interference from the opposable grippers of the gripper assembly 20. Alternatively, or in addition to, the one or more suction assets can be mounted such that the suction plane defined by the one or more suction assets is located at, or in a different elevation than, a surface of the support platform 14 from which the one or more suction assets are supported, respectively.

In another example, the one or more suction assets can be mounted (i.e., one of directly or indirectly) to one or more grippers of the gripper assembly 20. In one aspect, the one or more suction assets can be fixedly mounted to one or more respective grippers of the gripper assembly 20, such that their position is fixed relative to the respective grippers. In another aspect, the one or more suction assets can be moveably mounted to one or more respective grippers of the gripper assembly 20, such that the one or more suction assets can be caused to move or displace relative to the one or more grippers in a similar manner as discussed above with the one or more suction assets being moveably mounted to the support platform 14.

In still another example, a plurality of suction assets can be mounted (i.e., one of directly or indirectly, and one of fixedly or moveably) to both the support platform 14 and the grippers of the gripper assembly 20 in a similar manner as described above.

The object interfacing component of the one or more suction assets can comprise or be made of any material suitable to form at least one of a full or partial sealing interface with an object under a negative pressure, and to maintain the sealing interface while grasping and manipulating the object. In some examples, which are not intended to be limiting in any way, the object interfacing component having the interfacing surface can comprise or be made of at least one of a silicone material, a thermoplastic elastomer material, a rubber material, a polyvinyl chloride (PVC) material, a nylon material, an elastomer material, an Ethylene-Propylene Diene Monomer (EPDM) material, or others, or any combination of these as will be recognized by those skilled in the art.

The negative pressure system 40 can further comprise at least one negative pressure generator (and in some examples a plurality of negative pressure generators) (e.g., see negative pressure generator(s) 60) operable and in fluid communication with the one or more suction assets to facilitate generation of a negative pressure or partial vacuum within the one or more suction assets, and at the suction plane defined by the one or more suction assets. In one example, the negative pressure system 40 can comprise a single suction asset (e.g., suction asset 42*a*) operable with a negative pressure generator. In another example, the negative pressure system can comprise a plurality of suction assets (e.g., see suction assets 42*a*, 42*b*) operable with at least one negative pressure generator. With a plurality of suction assets, in one aspect each suction asset can be operable with a respective negative pressure generator, or in another aspect, at least one suction asset of the plurality of suction assets can be in fluid communication with at least one other suction asset of the plurality of suction assets via a manifold 70 (having a fluid passageway in fluid communication with each suction asset and at least one negative pressure generator), such that a single negative pressure generator is operable to generate a negative pressure within each interconnected suction asset.

In one example, the at least one negative pressure generator can comprise a direct vacuum pump in fluid communication with any one of or a plurality of the one or more suction assets via one or more vacuum lines or channels, and any connectors or other connection components situated between the vacuum pump and the one or more suction assets. In operation, the direct vacuum pump can be configured and operable to directly draw fluid from any of the connected one or more suction assets, thus generating a negative pressure at or within the one or more suction assets. Types of direct vacuum pumps can include, but are not limited to, positive displacement pumps, momentum transfer pumps, and others, and combinations of these, as will be recognized by those skilled in the art.

In another example, the negative pressure generator can comprise a venturi vacuum system comprising a venturi vacuum device (otherwise known as a venturi pump, an air ejector, or a vacuum ejector) and a positive pressure source operable to supply compressed fluid to the venturi vacuum device. The venturi vacuum generator can create a vacuum at or within the one or more suction assets. The venturi vacuum device can be operably connected to a source capable of providing a high velocity, compressed working fluid, otherwise known as a motive fluid (e.g., air). The venturi vacuum device can comprise a venturi chamber or jet nozzle designed to generate a region or area of low pressure that can draw fluid into and through an inlet of the venturi vacuum device, and then expel or eject the high velocity motive fluid and the fluid drawn in by vacuum out an outlet of the venturi vacuum device. In operation, the motive fluid can be supplied to the venturi vacuum device from a positive pressure source, which motive fluid can be moved through the venturi vacuum device to generate the region or area of low pressure, thus creating a vacuum at a desired location within the venturi vacuum device. The inlet of the venturi vacuum device can be located and in fluid communication with this area of low pressure. The venturi vacuum device can be in fluid communication with one or more suction assets, such that a negative pressure is provided at and within the one or more suction assets in response to the motive fluid being supplied to and forced through the venturi vacuum device to generate the area or region of low pressure, which induces or generates the negative pressure at the connected one or more suction assets. Types of venturi vacuum devices can include, but are not limited to, venturi air jets, eductors, vacuum ejectors and others as will be recognized by those skilled in the art.

With respect to different possible arrangements with the one or more suction assets, in one example, a negative pressure generator can be operable with a single suction asset. In another example, a negative pressure generator can be operable with a plurality of suction assets, these being interconnected and in fluid communication with one another. Moreover, the negative pressure generator can be directly connected to a suction asset, or indirectly connected to a suction assets via a vacuum line of channel using one or more connectors, such that the suction assets and the negative pressure generator are separated from one another. A negative pressure generator can be supported at a position so as to be immediately adjacent the suction assets (e.g., directly connected, or indirectly connected yet in close proximity), or it can be supported at a position away from the suction assets, such as on another component of the end-effector 10 (e.g., if the suction assets are supported on the gripper assembly, the venturi vacuum device(s) can be supported on the support platform 14), or on the robot to which the end-effector 10 is coupled. These arrangements are not meant to be limiting in any way as the present technology contemplates the suction assets being supported on any component of and at any position on the end-effector as is suitable for their intended purpose, with the requisite components of the negative pressure generator also being supported on any component of and at any position on the end-effector 10 (or robot) as is suitable for their intended purpose.

The negative pressure system 40 can further comprise a valve or valve system 74 operable with the one or more suction assets 42 and the at least one negative pressure generator 60 to manage the flow of air between any of the one or more suction assets 42 and any respective negative pressure generators 60. Numerous different types and configurations of valves, valve systems, associated valve components are contemplated for use with the one or more suction assets 42 and/or the negative pressure generator(s) 60, and such will not be discussed in detail herein. Suffice it to say that the negative pressure system 40 can comprise one or more valves or valve systems 74 operable with one or more suction assets 42 and/or one or more negative pressure generators 60 to control, manage, direct or otherwise manipulate the flow of fluid within the negative pressure system 40. In some examples, the valve systems 74 can comprise valves and/or related components that are operable to interrupt the airflow within the negative pressure system. For example, check valves can interrupt the flow of air as soon as a certain volume flow has been achieved, which effectively shuts off any suction assets that may not be completely sealed to an object to be grasped. In another example, flow resistors or restrictors can be used to reduce the flow cross-section in the negative pressure system 40, such as when the end-effector 10 is being used to grasp porous objects. The valve(s) or valve system(s) 74 can further be connected to a control system 98 (discussed below) operable to control the valve(s) or valve system(s) 74 as needed or desired. The end-effector 10 can further comprise one or more sensors 94 (which can be part of and operable within the negative pressure system 40, or part of the end-effector 10) to sense or measure one or more characteristics of the negative pressure system 40, such as negative or positive pressure, fluid flow volume, fluid flow rate, and other characteristics. Sensors 94 can include, but are not limited to, pressure sensors, flow sensors, and others.

The negative pressure system 40 can further comprise, and specifically the one or more suction assets 42 can themselves comprise, a local occluding valve or valve system 76 operable within any number or all of the one or more suction assets 42. The local occluding valve or valve system 76 can be configured to restrict or occlude the flow of air through an associated or respective suction asset of the one or more suction assets and between the suction asset and any respective negative pressure generators, thus effectively rendering such suction asset inoperable at select times when needed or desired. Local occluding valves can include, but are not limited to, various types of mechanical sensing valves. In one example, the local occluding valve system 76 can comprise a floating ball valve supported within the one or more suction assets, wherein a floating ball or other structure is operable to move to restrict or occlude fluid flow based on a given pressure or volume of flow within the associated suction asset. In another example, the local occluding valve system 76 can comprise a spring-loaded plunger (e.g., a button valve) that facilitates airflow through the suction asset upon the suction asset coming into contact with a load (e.g., an object to be grasped) with enough force to displace the button valve, thus opening the air passageway between the suction asset and the associated vacuum line or channel to achieve a negative pressure within the suction asset. Providing some type of local occluding valve or valving system within the one or more suction assets is particularly relevant with an array of suction assets (e.g., see first and second suction assets **42*a*, 42*b***), wherein in some applications, less than all of the suction assets may be used to interface with an object. In this scenario, those suction assets that are in the array, but out of contact with the object to be grasped, or in partial contact with the object such that a complete seal is not formed with the object (these being referred to as non-sealed suction assets) can be neutralized (i.e., effectively shut-off completely or partially) by causing a local occluding valve or valve system within each of the non-sealed suction assets to move into a position to physically restrict or occlude the suction asset or the vacuum line or channel, thus restricting or occluding airflow through the non-sealed suction assets.

The multi-functional robotic end-effector 10 can further comprise a functional asset in the form of one or more magnets or magnet systems 80 (e.g., see first and second magnets 80*a*, 80*b*, as well as optional magnets or magnet systems 80*c*, 80*d* supported within a perimeter of the suction asset 42*a*). In relation to the gripper assembly and the one or more suction assets, the one or more magnets or magnet systems 80 can be arranged in a variety of ways. In one example, the one or more magnets or magnet systems can be supported on or by the support platform 14, such that an associated magnetic interface (the surface of the magnet or magnetic system that comes into contact and interfaces with an object to be grasped) is positioned outside of a perimeter of the one or more suction assets (e.g., see magnets or magnet systems 80*a*, 80*b*). In another example, the one or more magnets or magnet systems can be supported on or by the support platform 14, or on the one or more suction assets themselves, such that an associated magnetic interface is located within a perimeter of the one or more suction assets (e.g., see magnets or magnet systems 80*c*, 80*c*). In this example, the one or more magnets of magnet systems can comprise a fluid passageway formed therein (e.g., see fluid passageway 82*c* in magnet 80*c*, and fluid passageway 82*d* in magnet 80*d*). In another example, the one or more magnets or magnet systems 80 can be supported on a gripper of the gripper assembly 20, such that an associated magnetic interface is positioned within the gripping region of the gripper assembly 20. In another example, any combination of the above arrangements is contemplated.

Moreover, the end-effector 10 can have a single magnet or magnet system 80. In another aspect, the end-effector 10 can have multiple magnets or magnet systems 80, such as a pair of magnets or magnet systems or an array or series of magnets or magnet systems (e.g., three or more). For example, the end-effector 10 can have an array or series of four magnets or magnet systems. Each magnet or magnet system can have a magnet interface or surface operable to interface with and magnetically attach to a ferromagnetic object. The magnets or magnet systems 80 can define a magnetic engagement plane, which can comprise and define and be formed about a linear plane or in some cases a curved plane. In one aspect, the array of magnets or magnet systems 80 can have magnetic interfaces that are coplanar, and the array of magnets or magnet systems 80 can together define the magnetic engagement plane. The magnet interface(s) can be exposed, unobstructed, and can form the outermost contact surface for engaging with the ferromagnetic object, such as sheet metal or plates. The one or more magnets or magnet systems can be similar to those described in U.S. Pat. No. 8,892,258, which is hereby incorporated herein by reference. The magnets, or the pair of magnets, or the array of magnets (or the magnet systems) 80, can be spaced-apart from one another to create a larger outermost contact surface and to reduce moments between the magnets or magnet systems and the ferromagnetic object. In addition, the array of magnets or magnet systems 80 can be positioned linearly, or in a linear array. Such a linear configuration can align the magnets or magnet systems to handle narrower objects or pipe. The magnets or the magnet interfaces thereof can be or can form at least a portion of the palm or palm face of the support platform 14.

The one or more magnets or magnet systems 80 described herein can comprise, in one aspect, a variable strength magnet or magnet system or mechanism, such as those described in U.S. Pat. No. 8,892,258, which is incorporated by reference herein in its entirety. The variable strength magnet can be actuated to activate a magnetic field (e.g., to grasp an object), and can be deactivated to remove the magnetic field (e.g., such as to facilitate release of the grasped object). With the variable strength magnet, the magnetic end effector is capable of lifting discriminate payloads by selectively varying the strength of the magnetic forces output by the magnetic end effector. For example, the strength of the magnet can be selected to as to grasp a single sheet of steel lying on top of one or more additional steel sheets. The strength would permit grasping the single sheet without lifting any other sheets. Once the sheet is lifted from the stack, the magnetic strength of the magnet can be increased as desired to maintain the grasp on the sheet. An actuator can be operatively coupled to the variable strength magnet end effector, wherein the actuator is selectively actuatable to control the adjustment of the variable strength magnet. The actuator may also be configured to maintain the variable strength magnet at a desired magnetic force output strength once achieved for any given amount of time.

The variable strength magnet can be in communication with a control unit or system designed and operable to control the magnet, and particularly the intensity of the magnet. For example, the control unit can be used to activate and continuously adjust the magnet. The magnet intensity can be adjusted to an infinite number of output magnetic strengths or magnetic strength output levels. The actuator can be selectively actuatable to control the adjustment of the variable strength magnet, and to maintain the variable strength magnet at a desired magnetic force output strength to secure the object to the end effector. The strength or intensity of the magnetic force is selectively and continuously adjustable throughout a range between full strength and no strength. More particularly, the strength of the variable strength magnet may be infinitely adjustable within the given range.

In one specific example, the variable strength magnet can comprise a permanent magnet having north and south polar regions. In some non-limiting examples, the permanent magnet can comprise at least one of Neodymium Iron Boron, Samarium Cobalt (SmCo), Alnico, Ceramic, or Ferrite. However, these are not to be considered limiting in any way. The permanent magnet can be situated in a housing. Within the housing there can be disposed a first and second block of a ferrous material, such as iron. The first and second blocks can be separated by a non-ferrous material, such as brass or aluminum, also disposed within the housing. Extending along in a direction of a plane in the interior of the housing and through the ferrous and non-ferrous material, respectively, a cavity can be formed that is sized and configured to receive the permanent magnet. The strength of the magnetic force of the permanent magnet can be variable depending upon the orientation or position of the permanent magnet, and particularly the north and south polar regions. For example, the position of the permanent magnet, and particularly the north and south polar regions, can be such that the north and south polar regions are positioned in a vertical orientation in line with the non-ferrous material, which functions to turn off the variable strength magnet. In this "full off" position, no magnetic force is registered or produced through the variable strength magnet. Conversely, orienting the permanent magnet so that the north and south polar regions are horizontal and in line and in contact with the ferrous material causes the variable strength magnet to produce a maximum magnetic force or strength output. Orienting the permanent magnet in this "full on" position can be accomplished, for example, by rotating the permanent magnet to be into contact with first and second blocks of the ferrous material.

As indicated above, in one aspect, selectively controlling the rotation of the permanent magnet can be used to selectively increase and decrease the strength or intensity of the magnetic force of the variable strength magnet. Specifically, causing the permanent magnet to be positioned in one of an infinite number of positions between the "full on" and "full off" positions can enable a magnetic force of a lesser degree as compared to the permanent magnet's "full on" or full powered position. In these in between positions, the magnetic flux extends partially through the ferrous material and the non-ferrous material to produce a reduced magnetic force. Continuously varying the permanent magnet position between these positions effectively functions to vary the strength of the magnetic force.

The position of the permanent magnet can be controlled in a number of ways and via a number of different types of actuators. In one example, the end-effector 10 can comprise, or be configured to operate with, an actuator device operably linked to the permanent magnet through at least one communication element that links or otherwise associates the permanent magnet with an actuator that facilitates control of the adjustment of the permanent magnet. The actuator device may be operably linked to the permanent magnet via the communication element in a variety of ways. In one non-limiting example, the actuator device is operably linked to the permanent magnetic via, and the communication element comprises, a shaft member that extends outward from the permanent magnet, and that is coupled or otherwise secured to the permanent magnet, such that rotation of the shaft rotates the permanent magnet. The actuator can be in communication with the control system, thus enabling control of the rotation of the shaft, and therefore the permanent magnet, by actuating the actuator. In some examples, the actuator may not actually be a part of the end-effector 10, but rather supported about a different structure, such as the robotic arm in support of the end-effector 10.

In one aspect, the actuator functions to enable the user to control the rotation of the permanent magnet. As previously discussed, the rotation of the permanent magnet can function to adjust the strength of the magnetic force. Accordingly, through control of the rotation imparted to the magnet by the actuator, the magnetic force of the permanent magnet can be adjusted and controlled. Moreover, the actuator functions to be able to maintain the achieved magnetic force for any given period of time. It is contemplated that any suitable actuator type may be used, such as, but not limited to, electrical actuators (e.g., electric motors, hydraulic actuators, rotary actuator, pneumatic actuators, motors, etc.). Other configurations of variable strength magnets that could be incorporated into the end-effector 10 are contemplated herein, and will be apparent to those skilled in the art.

In another example, the one or more magnets or magnet systems 80 can comprise an electromagnet operable to be actuated and deactivated to apply and remove a magnetic field. Types of electromagnets that can be incorporated into the end-effector 10 described herein will be apparent to those skilled in the art. The electromagnet can comprise or be associated with an electronic actuator that delivers current to the electromagnet. In one aspect, the electromagnet can comprise a metal core, such as an iron alloy. A wire coil can be wrapped around the metal core and a current from a power source can be directed to the wire coil. The power source may be any type, such as, but not limited to, a battery source or power from a power grid.

The multi-functional robotic end-effector 10 can further comprise one or more sensors 94 operable to sense or measure an aspect of the end-effector 10. The sensor(s) 94 can be in communication with the control system. One or more sensors 94 can be associated or operable with, so as to measure an aspect of, any of the functional assets discussed and described herein. Moreover, one or more sensors 94 can be associated or operable with the robotic arm interface 96. Types of sensors can include, but are not limited to, position sensors, orientation sensors, load or force sensors, fluid flow sensors, pressure sensors, and others as will be recognized by those skilled in the art.

The multi-functional robotic end-effector 10 can further comprise a robotic arm interface 96 operable to facilitate the mechanical coupling and decoupling of the end-effector 10 from a supporting robotic arm (not shown) or other device or system, as well as to facilitate the supply and/or exchange of at least one of power, data, fluid to the end-effector from an external source. The end-effector 10 can be removably coupled to the robotic arm via the robotic arm interface 96 (e.g., through a mechanical system, such as a quick release or other type of system), such that the end-effector 10 can be mechanically coupled to and uncoupled from the robotic arm. Configuring the robotic arm interface 96 to facilitate removably coupling of the end-effector 10 to the robotic arm serves a variety of purposes, such as facilitating the interchanging of the end-effector 10 with another end-effector if needed, to repair or service the end-effector 10, or for any other purpose. It is contemplated that the end-effector 10 can be removably coupled to the robotic arm in a variety of ways. In one example, the end-effector 10 can include an attachment end comprising the robotic arm interface 96, which can be configured and sized to couple to the receiving end of the robotic arm. Conversely, the receiving end of the robotic arm can be configured and sized to receive the attachment end of the end-effector 10. The robotic arm interface 96 can be configured to securely support and maintain the end-effector 10 during use of the robotic arm and end-effector 10. The coupling between the robotic arm and the end-effector 10 made possible by the robotic arm interface 96 can include mating couplers, sockets or any other mechanical interconnection or system. The coupling can provide a physical restraint for the end-effector 10 when coupled to the robotic arm, such that the coupling can withstand the loads placed on the end-effector 10. In addition to the mechanical interface or connection, the robotic arm interface 96 can comprise at least one of a power interface or connection, a data interface or connection, or a fluid interface or connection (e.g., a hydraulic coupling, a pneumatic coupling, a positive and/or negative pressure source coupling). Of course, the robotic arm interface 96 can further comprise any combination of these connections, or others as will be recognized by those skilled in the art.

The multi-functional robotic end-effector 10 can further comprise or be in communication with a control system 98, which can comprise one or more computers. The control system can be used to control any aspect and any component or system of the end-effector 10, namely the various types of grasping, lifting and manipulation assets discussed herein. In addition, the control system can be in communication with any sensors of the end-effector 10. The control system can comprise one or more processors and one or more memory devices, as well as one or more software components stored on the memory device(s), wherein the software component(s) comprise(s) executable code or instructions facilitating the functions or processes of the end-effector as described herein. Specifically, the executable code or instructions can be executed by the one or more processors to cause the end-effector to carry out its intended functions and processes. In one example, the control system can comprise a dedicated computing device configured for control of the end-effector only. In another example, the control system can comprise or be part of (i.e., integrated with) a high-level control module or system, such as one used to control the robot or robotic arm to which the end-effector is coupled, wherein the high-level control system comprises one or more processors, one or more memory devices, as well as one or more software components stored on the memory device(s) comprising executable code or instructions facilitating the functions or processes of the end-effector as described herein.

Although the end-effector 10 has been described as having a negative pressure configuration primarily relying on the negative pressure system for effecting grasping and manipulation of an object, a mechanical grip configuration primarily relying on the opposable grippers for effecting grasping and manipulation of an object, and a magnetic manipulation configuration primarily relying on the magnet(s) for effecting grasping and manipulation of an object, it is to be understood that any combination of these configurations can be utilized in addition to each being able to be used independently of the others. In one aspect, the multi-functional robotic end-effector can be controlled to retract and position the gripper assembly out of the way behind the suction plane, and to activate the negative pressure system, such that the negative pressure system, via deployment of at least one suction asset, is the only functional asset effecting grasping and manipulation of an object. In another aspect, the multi-functional robotic end-effector can be controlled to activate both the gripper assembly and the negative pressure system to effect grasping and manipulation of an object, wherein the multi-functional robotic end-effector deploys an opposable gripper arrangement and at least one suction asset, such that the multi-functional robotic end-effector is in both a mechanical grip configuration and a negative pressure manipulation configuration. In still another aspect, the multi-functional robotic end-effector can be controlled to retract and position the gripper assembly out of the way behind the suction plane, and to activate the one or more magnets or magnet systems, wherein the one or more magnets or magnet systems is the only functional asset effecting grasping and manipulation of an object. In still another aspect, the multi-functional robotic end-effector can be controlled to activate both the gripper assembly and the one or more magnets or magnet systems to effect grasping and manipulation of an object, wherein the multi-functional robotic end-effector deploys an opposable gripper arrangement and the one or more magnets or magnet systems, such that the multi-functional robotic end-effector is in both a mechanical grip configuration and a magnetic manipulation configuration. In still another aspect, the multi-functional robotic end-effector can be controlled to activate both the negative pressure system and the one or more magnets or magnet systems to effect grasping and manipulation of an object, wherein the multi-functional robotic end-effector retracts the gripper assembly and deploys, such that the multi-functional robotic end-effector is in both a negative pressure configuration and a magnetic manipulation configuration. In still another aspect, the multi-functional robotic end-effector can be controlled to activate only the gripper assembly, such that the gripper assembly, via deployment of at least one opposable gripper arrangement, is the only functional asset effecting grasping and manipulation of an object.

Figure 2:
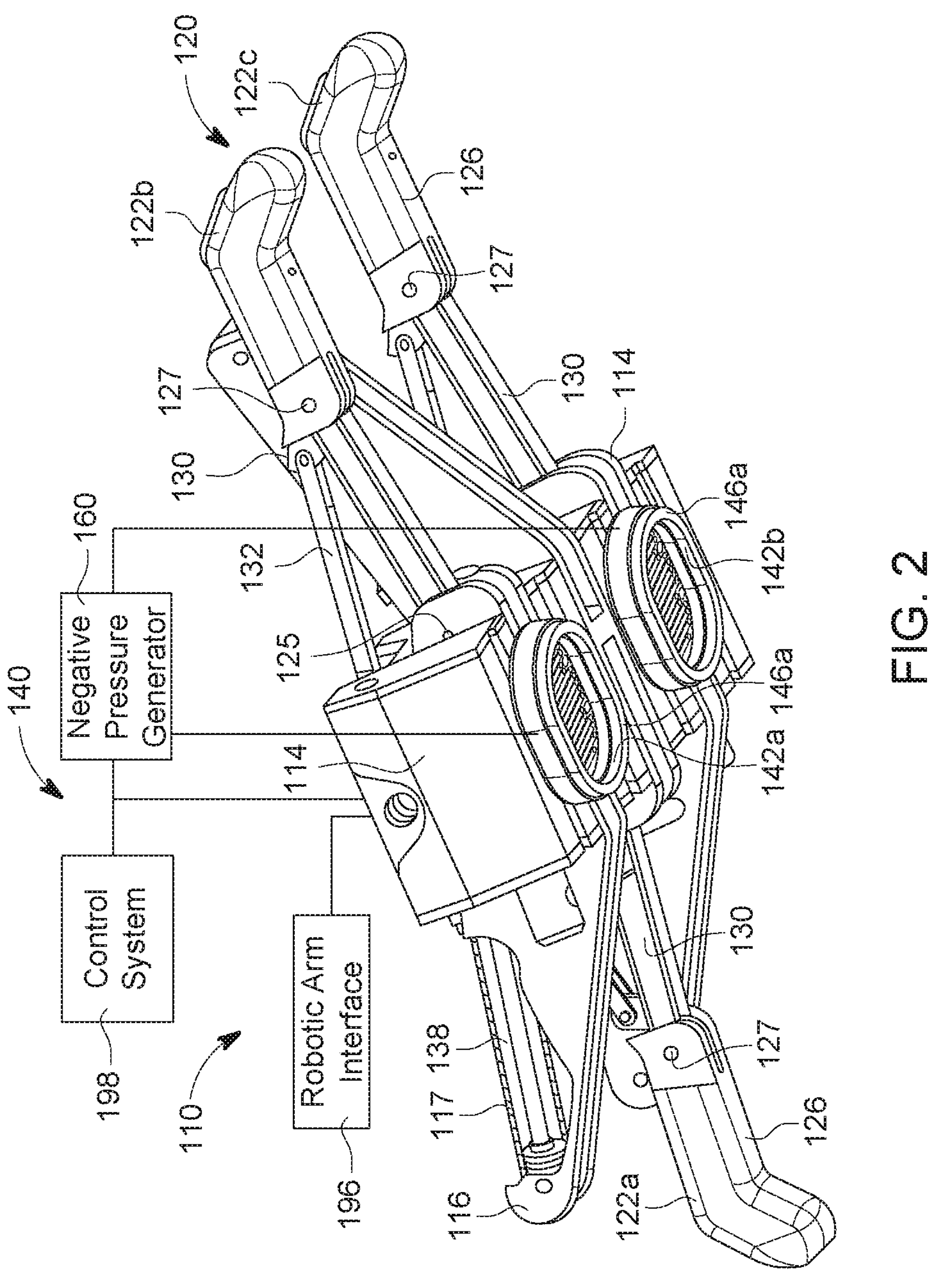
FIG. 2 illustrates a perspective view of a multi-functional robotic end-effector with both a negative pressure system having multiple suction assets and a gripper assembly having multiple grippers in accordance with an example of FIG. 1, and shown with the grippers in a retracted configuration and the end-effector in a negative pressure manipulation configuration.
Figure 3:
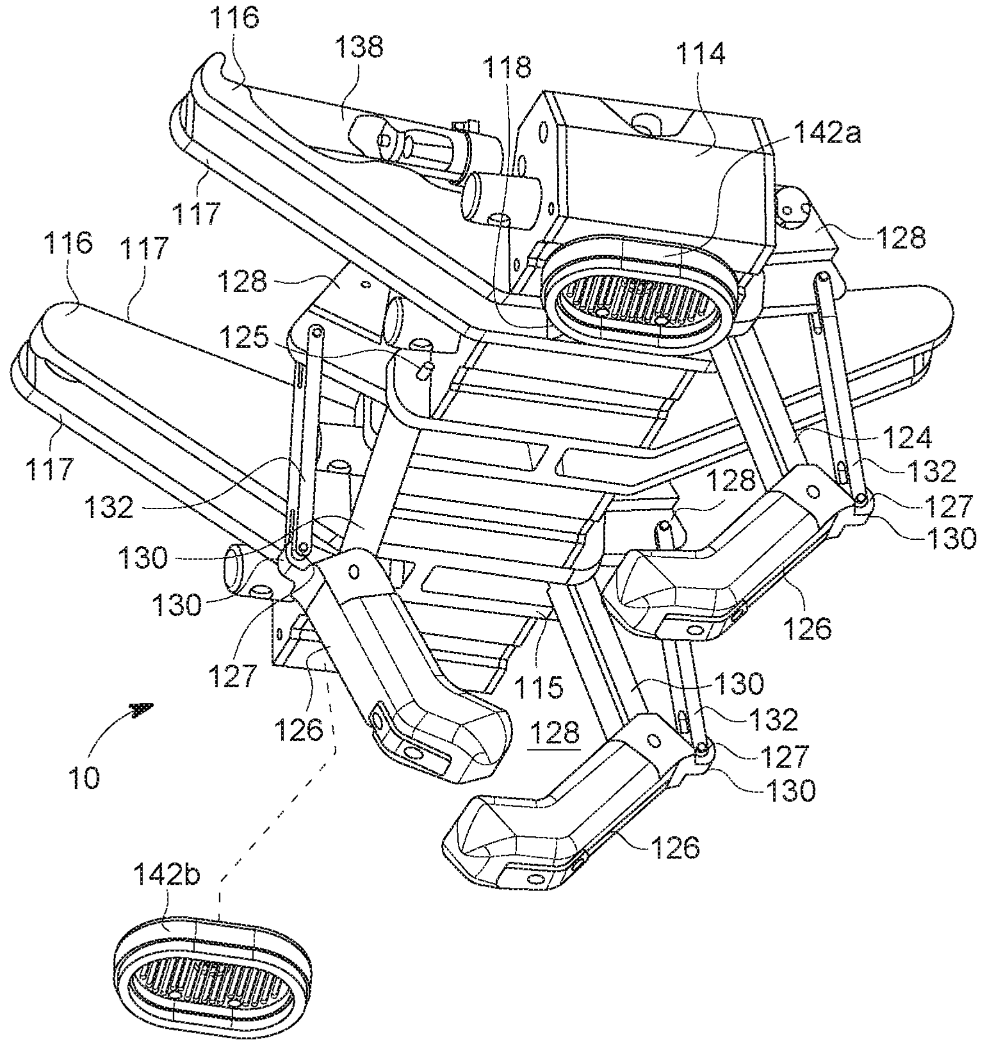
FIG. 3 illustrates a perspective view of the multi-functional robotic end-effector of FIG. 2 with the grippers in a deployed or grip configuration and the end-effector in a mechanical grip configuration, and a negative pressure manipulation configuration.
Figure 4:
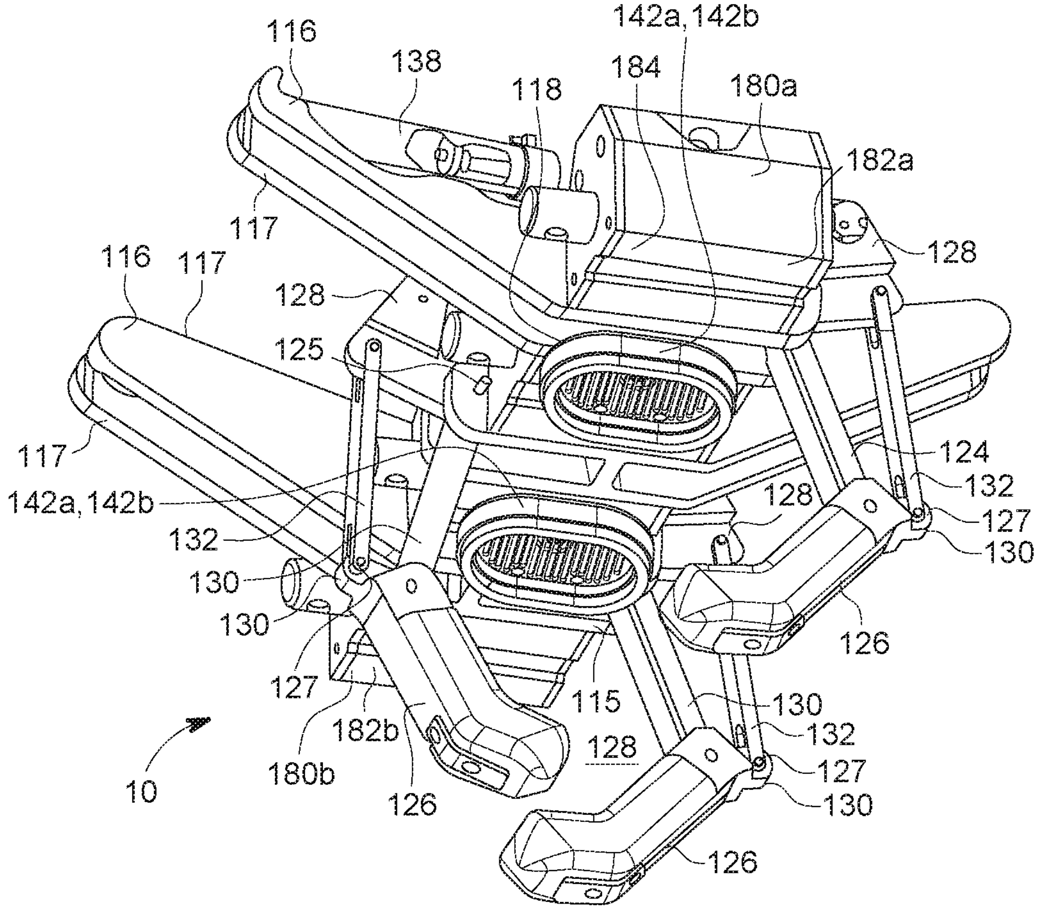
FIG. 4 illustrates a perspective view of a multi-functional robotic end-effector having a negative pressure system having multiple suction assets, a gripper assembly having multiple grippers, and a magnet/magnetic system in accordance with an example of FIG. 1, and shown with the grippers in a deployed or grip configuration and the end-effector in a mechanical grip configuration, and at least one of a negative pressure manipulation configuration or a magnetic manipulation configuration.
Figure 5:
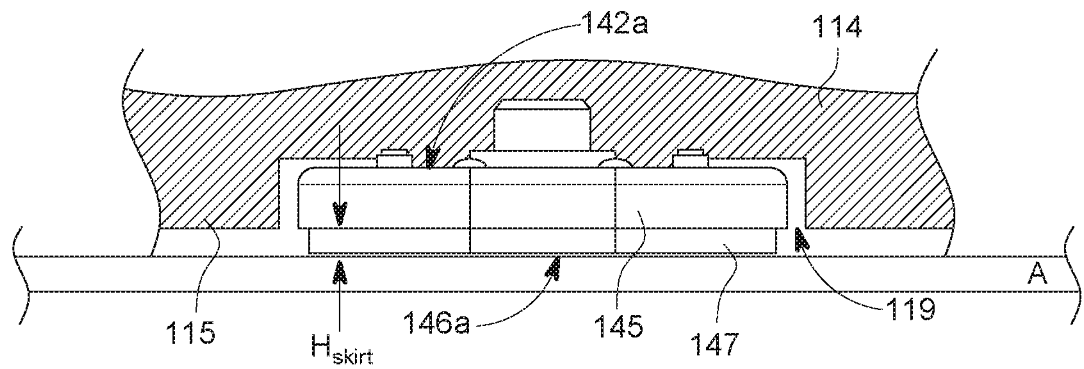
FIG. 5 illustrates a partial cross-sectional side view of a multi-function robotic end-effector in accordance with an example of FIG. 1, and showing a support platform comprising a recess formed in a surface, and a suction asset supported within the recess.

With reference to FIGS. 2-4, illustrated is a specific, example multi-functional robotic end effector 110 having a three gripper opposable gripper arrangement based on the various examples of the multi-functional robotic end effector 10 set forth in FIG. 1. As such, the above discussion of FIG. 1 is intended to be incorporated here and/or referred to for additional understanding, support and teachings of the end-effector 110 of FIGS. 2-4. FIG. 2 depicts the end-effector 110 in a negative pressure manipulation configuration for primarily using a negative pressure system 140 to grasp an object, and with opposable grippers 122*a*, 122*b*, and 122*c* of the gripper assembly 120 retracted. FIG. 3 depicts the end-effector 110 in a finger or mechanical grip configuration for primarily using the grippers 122*a*, 122*b*, and 122*c* to grasp an object, and with the grippers 122*a*, 122*b*, and 122*c* in a deployed, grip or extended configuration. In this example, the end-effector 110 can comprise a support platform 114 having a frame or frame-like configuration 115 defining an outer, lowermost surface, which in this example is configured to interface or engage with an object (thus being referred to as an engagement or interfacing surface), and which outer surface, in this example, can also be referred to as a palm (e.g., see palm 115) as it is situated between the opposable grippers 122*a*, 122*b*, and 122*c* (which can therefore be referred to as fingers) of the gripper assembly 120. The support platform 114 can have a robotic arm interface 196 operable to facilitate coupling of the end-effector 110 to a robotic arm (not shown), which robotic arm can be part of a robot (not shown) in some examples. The robotic arm interface 196 can comprise at least one of a mechanical interface or connection, a power interface or connection, a data interface or connection, or a fluid interface or connection, as discussed above, operable to facilitate operation and function of the end-effector 110.

In one aspect, the end-effector 110 can comprise a negative pressure system 140 comprising a negative pressure generator 160 operable with at least one suction asset (e.g., see suction assets 142*a* and 142*b*), which suction assets can be supported by the support platform 114 and in fluid communication with the negative pressure generator 160, as discussed above. In another aspect, the end-effector 10 can have multiple suction assets, such as a pair of suction assets or an array or series of suction assets (e.g., three or more suction assets). As shown, each of the suction assets 142*a* and 142*b* can comprise an object interfacing component 146*a* having and defining an outermost interfacing surface configured and operable to engage and interface with (e.g., form at least a partial seal to) the object to be grasped. The suction assets 142*a* and 142*b* can each define a suction engagement surface and a corresponding suction plane, which can comprise and define and be formed about a linear plane or in some cases a curved plane. In another aspect, the array of suction assets 142*a* and 142*b* can have interfacing surfaces that are coplanar, and the interfacing surfaces of the respective array of suction assets 142*a* and 142*b* can together define a suction engagement surface and corresponding suction plane. The suction assets 142*a* and 142*b* and the engagement surface (e.g., the palm 115) of the support platform 114, as well as the robotic arm interface 196, can be disposed proximally with respect to the suction engagement surface and corresponding suction plane. Thus, the object interfacing components 146*a*, 146*b* of the respective suction assets 142*a*, 142*b*, and particularly the respective interfacing surfaces of these, can be exposed, unobstructed, and can form the outermost contact surface for engaging with the object. The suction assets 142*a* and 142*b* can be spaced-apart from one another to create a larger outermost suction engagement surface and to reduce moments between the suction assets 142*a* and 142*b* and the object being grasped. In addition, the array of suction assets 142*a* and 142*b* can be positioned linearly, or in a linear array, as shown. Such a linear configuration can align the suction assets 142*a* and 142*b* to grasp narrower objects. In another example, the suction assets 142*a* and 142*b* can help form at least a portion of the lowermost surface of the support platform 114.

The end-effector 110 can further comprise a gripper assembly 120 having an array of grippers, and specifically a three gripper opposable gripper arrangement, namely first gripper 122*a*, second gripper 122*b*, and third gripper 122*c*. The array of grippers can be positioned in a non-linear matrix. Each gripper can be pivotally coupled to the support platform 114, and can pivot to oppose one another and/or the palm 115 or the suction assets 142*a* and 142*b* to grip the object or another object in a gripping region 128 between the grippers and/or the palm 115 or the suction assets 142*a* and 142*b*. The grippers are considered to oppose one another even if they are off-set with respect to one another. Thus, one gripper (e.g., first gripper 122*a*) can oppose and be off-set with respect to another gripper or grippers (e.g., second and third grippers 122*b* and 122*c*), wherein these can define and operate within the gripping region 128.

The gripper(s) and the end-effector 110 can have at least two configurations, comprising a deployed mechanical grip (i.e., extended) configuration, as shown in FIG. 3, and a retracted configuration, as shown in FIG. 2. In the deployed configuration, the gripper(s) are positioned distally with respect to the support platform 114, and oppose one another and the lowermost surface (e.g., palm 115) of the support platform 114, as well as the suction assets 142*a*, 142*b*. The end-effector 110 and the gripper(s) can grip the object or the other object between the gripper(s) and the palm 115 or the suction assets 142*a*, 142*b*. With the grippers deployed, the end-effector 110 can also be in the negative pressure configuration with the suction assets 142*a*, 142*b* actuated. In the retracted configuration, the gripper(s) can be positioned proximally with respect to the suction engagement surface along with the suction assets 142*a*, 142*b* and the lowermost surface of the support platform 114, with the grippers being positioned behind the suction plane. With the grippers in this retracted configuration, the object interfacing components 146*a*, 146*b* of the suction assets 142*a*, 142*b* form an outermost contact surface for interfacing with and at least partially sealing to the object. The gripper(s) are positioned behind the object interfacing components 146*a*, 146*b* and the corresponding suction plane in the retracted configuration so that the gripper(s) do not interfere with the object being grasped when the negative pressure system 140 is activated. With the gripper assembly 120 retracted and inactive, and the negative pressure system 140 active, the end-effector 110 is operable in the negative pressure configuration with the suction assets performing the grasping function of the end-effector 110. As can be seen, the end-effector 110 can be used to grasp objects using the negative pressure system 140 and/or the gripper assembly 120. This can occur with both acting together simultaneously at any given time, or this can occur with either one active and the other dormant at any given time. As described above, the array of suction assets 142*a*, 142*b* can be linear, and the array of suction assets 142*a*, 142*b* can be disposed in a gripping region 128 of the array of grippers in the mechanical grip configuration, as shown in FIG. 3. Thus, all of the grippers and all of the suction assets 142*a*, 142*b* can be utilized to grasp an object.

In one aspect, the support platform 114 can comprise a frame 116. The grippers can each be pivotally coupled to the frame 116. The palm 115 and the frame 116 can comprise a pair of spaced-apart flanges 117 intercoupled by a web 118. The gripper can be pivotally coupled between the pair of spaced-apart flanges 117. The frame 116 can be formed of metal, and can be formed by machining or casting. Other materials, or a composite of materials, are also contemplated, which will be apparent to those skilled in the art.

In one aspect, each of the first, second and third grippers 122*a*, 122*b*, 122*c* can comprise a proximal segment or phalange 124 pivotally coupled to the palm 115, frame 116 or flanges 117 at a proximal pivot 125. A distal segment or phalange 126 can be pivotally coupled to the proximal segment 124 at a distal pivot 127. Thus, in one aspect, each of the first, second and third grippers 122*a*, 122*b*, and 122*c* can comprise two segments or phalanges. In another aspect, each gripper can comprise three segments or phalanges. The grippers, or the segments thereof, can be formed of metal, such as by machining or casting, or of plastic, such as by injection molding or 3D printing, or of other materials, or a composite of materials.

The proximal and distal segments 124 and 126 of the gripper(s) can have at least two configurations, comprising a straight configuration, as shown in FIG. 2, and a cant configuration, as shown in FIG. 3. Referring to FIG. 3, the cant configuration corresponds to the deployed configuration of the gripper(s). In the cant configuration, the proximal and distal segments 124 and 126 are oriented transvers to one another to facilitate gripping an object. Referring to FIG. 2, the straight configuration corresponds to the retracted configuration of the gripper(s). In the straight configuration, the proximal and distal segments 124 and 126 are oriented substantially straight or in line with respect to one another. The segments or phalanges of the grippers need not be straight, and can form obtuse angles; but can be oriented relatively straight with respect to one another in the straight configuration, as compared to the cant configuration, and as shown in FIG. 2.

In addition, each gripper can further comprise a gripper articulation to actuate the gripper. The gripper articulation can comprise a proximal bellcrank 128 pivotally coupled to the support platform 114, the frame 116 or the flanges 117 at the proximal pivot 125. The proximal bellcrank 128 can pivot with respect to the palm 115 along with the proximal segment 124. In addition, the bellcrank 128 can extend from the palm 115 transverse to the proximal segment 124. A tab 130 can extend from the distal segment 126 at the distal pivot 127. The tab 130 can extend transvers with respect to the distal segment 126. In one aspect, the tab 130 and the distal segment 126 can define a distal bellcrank. A proximal link 132 can be pivotally coupled to and between the proximal bellcrank 128 and the tab 130. In addition, the proximal link 132 can be spaced-apart from the proximal segment 124. In one aspect, the proximal segment 124, the proximal link 132, the proximal bellcrank 128, and the tab 130 or the distal bellcrank can form a four-bar linkage. The proximal bellcrank 128 and the proximal link 132 can be formed of metal, such as by machining or casting, or of plastic, such as by injection molding or 3D printing, or of any other material or composite of materials. The tab 130 can be integrally formed with the distal segment 126 as a unitary or monolithic body.

An actuator 138 can be coupled to and carried by the support platform 114, the frame 116 or the flanges 117, and pivotally coupled to the proximal bellcrank 128. In one aspect, the actuator 138 can be a pneumatic cylinder. In another aspect, the actuator can be a hydraulic cylinder. In another aspect, the actuator can be an electric motor. The actuator 138 can push and pull the proximal bellcrank 128, which in turn pushes and pulls the proximal link 132; thus causing the proximal and distal segments 124 and 126 to extend and retract, respectively.

In one aspect, the proximal segment 124 can be straight or substantially straight; while the distal segment 126 can be angled, or can have two portions at an obtuse angle with respect to one another to facilitate grasping.

Although the end-effector 110 has been described as having a negative pressure manipulation configuration primarily relying on the negative pressure system 140 and the suction assets 142*a*, 142*b* for grasping, and a mechanical grip configuration primarily relying on the gripper assembly 120 for grasping, both the negative pressure system 140 and the gripper assembly 120 can be used together to both grasp an object in addition to being able to be used independently of one another.

The end-effector 110 can further comprise or be operably connected to a control system 198 as explained above in relation to FIG. 1, which control system 198 is operable to control the various controllable components, elements, systems of the end-effector 110.

With reference to FIG. 4, the end-effector 110 can further comprise a magnet or a magnet system 178 for facilitating a magnetic manipulation configuration of the end-effector 110. The magnet or magnet system 178 can comprise one or more functional assets in the form of magnets (e.g., see magnets 180*a* and 180*b*) that are supported by the support platform 114 and/or the gripper assembly 120. The end-effector 110 can have multiple magnets, such as a pair of magnets or an array or series of magnets (e.g., three or more magnets). For example, the end-effector 110 can have an array or series of two magnets 180*a* and 180*b*, as shown. Each magnet can have a magnet face or surface (see magnet faces 182*a* and 182*b* on first and second magnets 180*a* and 180*b*, respectively) to abut to and magnetically attach to an object suitable for being grasped via magnetic attraction, such as a ferromagnetic object, such as sheet metal or metal plates. In one aspect, the end-effector 110 can comprise one or more magnets, such as one or more permanent magnets, as described herein. In another aspect, the end-effector 110 can comprise a magnet system, also as described herein. Each of these can be referred to generally as a "magnet." The magnets can define a magnetic engagement surface (see magnetic engagement surface 184), which can comprise and define and be formed about a linear plane or in some cases a curved plane. In one aspect, the array of magnets can have magnetic faces that are coplanar, and the array of magnets can together define the magnetic engagement surface 184. The magnet(s), the palm 115 and the robotic arm interface 196 can be disposed proximally with respect to the magnetic engagement surface 184. Thus, the magnet face(s) can be exposed, unobstructed, and can form the outermost contact surface for engaging with the ferromagnetic object.

In this example, the first and second suction assets 142*a* and 142*b* are located in a different position as supported about the support platform 114 so as to be between the first and second magnets 182*a* and 182*b*. It is noted that in this example, the magnetic engagement surface 184 and the suction plane can be coplanar, or they can be in different planes or elevations relative to the lowermost surface of the support platform 114 (in this case the palm 115).

In one aspect, at least a portion of at least one gripper can be movably disposed between, or linearly aligned between, the pair of spaced-apart magnets 182*a* and 182*b* so that the gripper and the magnets alternate sequentially or can be in an alternating sequence. In another aspect, a pair of the grippers can be positioned on opposite sides of at least one magnet. Again, the grippers and the magnets can alternate sequentially or can be in an alternating sequence. In addition, each of the pair of grippers can be disposed on opposite sides of the palm 115, and can be capable of opposing one another across the gripping region 128. In another aspect, an array of magnets and an array of grippers can alternate sequentially or can be positioned in an alternating sequence. The one or more suction assets can be positioned at any location relative to any one of the grippers and/or the magnets. Thus, a structure of the palm 115 can be used to both carry and interconnect the gripper(s), the magnet(s), and the suction asset(s). In one aspect, the array of magnets can be linear, as shown. Thus, the magnets can be aligned for narrower objects, such as pipe.

Although the end-effector 110 has been described as having a negative pressure manipulation configuration primarily relying on the negative pressure system 140 and the suction assets 142*a*, 142*b* for grasping, a mechanical grip configuration primarily relying on the gripper assembly 120 for grasping, and a magnetic manipulation configuration primarily relying on the magnet(s), these can be used together in any combination to grasp an object in addition to being able to be used independently of one another.

With continued reference also to FIGS. 2-5, FIG. 5 illustrates the support platform 114 comprising a recess 119 sized and configured to receive one or more suction assets (e.g., suction asset 142*a*) therein, so as to locate the suction plane at the lowermost surface (e.g., in this case the palm 115) of the support platform 114 upon the negative pressure system 140 being activated. As shown, the suction asset 14*a* can comprise an object interfacing component comprising a load bearing structure 145 and a compliant skirt 147 supported by the load bearing structure, the compliant skirt comprising object an interfacing surface. Upon initial contact with an object (e.g., see object A) with the suction asset 142*a*, the compliant skirt engages or interfaces with the object, thus initially locating the suction plane at that interface. As the negative pressure system is activated to draw a vacuum, or in other words to apply a negative pressure to the suction asset 142*a*, the compliant skirt deforms (e.g., compresses), wherein the suction plane is moved towards the lowermost surface of the support platform 114. The depth of the recess 119 can be sized so that the load bearing structure is aligned or substantially aligned with the lowermost surface of the support platform 114 so that the suction plane is at or slightly below the lowermost surface of the support platform 114 when the compliant skirt is fully compressed. In this example, the height $H_{skirt}$ of the compliant skirt can be the same as or less then the gap between the object A and the lowermost surface of the support platform 114 upon the compliant skirt initially contacting the object A without the negative pressure system 140 activated. Locating the suction asset 142*a* within a recess allows the lowermost surface of the support platform 114 to engage with an object (with a surface of the object being able to essentially cover the recess and the suction asset) without the suction asset 142*a* being in the way and proud of (i.e., in a plane lower than) the lowermost surface of the support platform 114 where it otherwise may be obstructive.

Figure 6A:
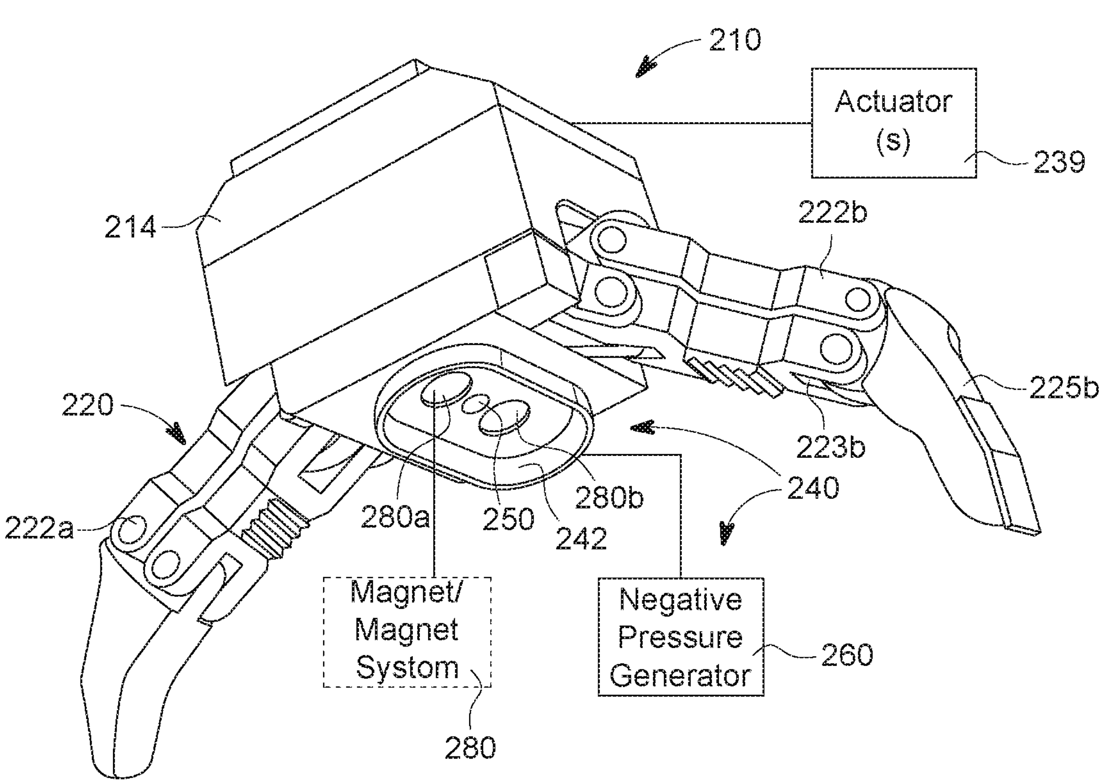
FIG. 6A illustrates a perspective view of a specific multi-function robotic end-effector in accordance with an example of FIG. 1, the multi-function robotic end effector comprising a negative pressure system and a gripper assembly, and optionally a magnet or magnet system, the gripper assembly comprising a two gripper opposable gripper arrangement.
Figure 6B:
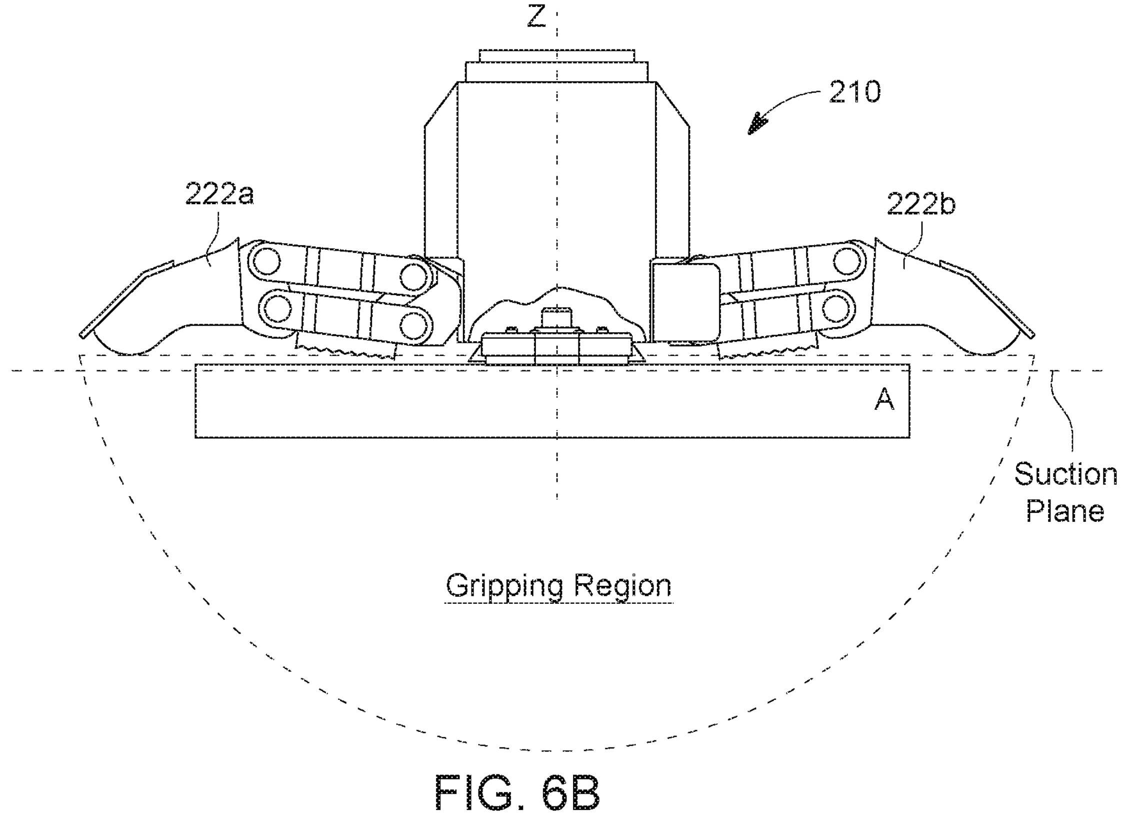
FIG. 6B illustrates a side view of the multi-function robotic end-effector of FIG. 6A, with the gripper assembly retracted, and the multi-function robotic end-effector in at least one of a negative pressure manipulation configuration or a magnetic manipulation configuration.
Figure 6C:
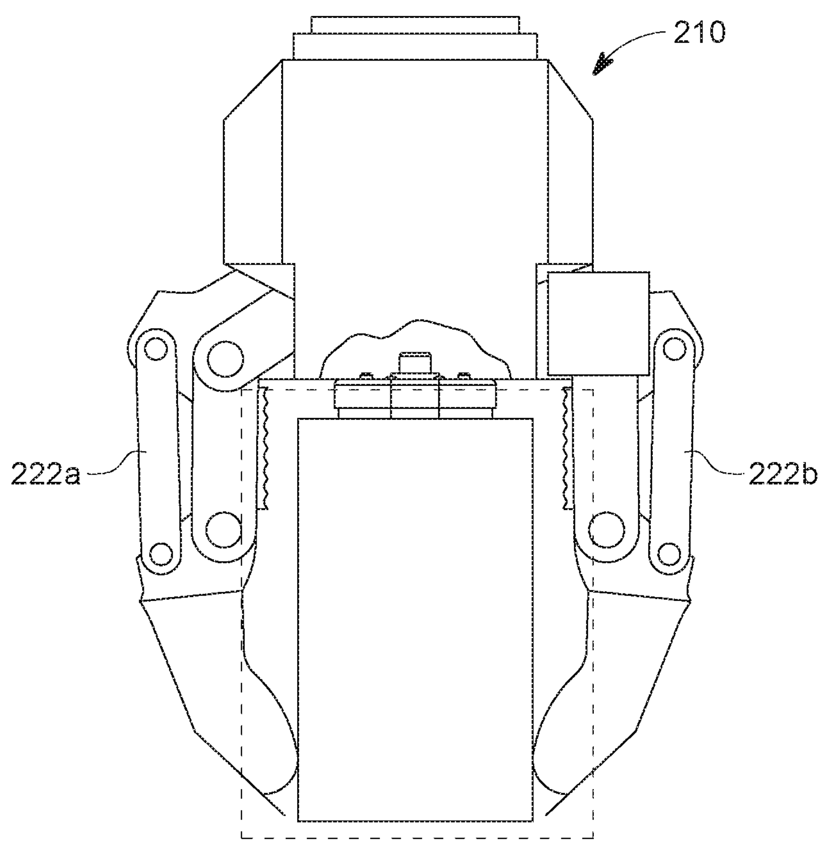
FIG. 6C illustrates a side view of the multi-function robotic end-effector of FIG. 6A, with the multi-function robotic end-effector in a mechanical grip configuration as well as at least one of a negative pressure manipulation configuration or a magnetic manipulation configuration.

With reference to FIGS. 6A-6D, illustrated are specific, example multi-functional robotic end effectors 210 and 210' having a two gripper opposable gripper arrangement based on the various examples of the multi-functional robotic end effector 10 set forth in FIG. 1. As such, the above discussion of FIG. 1 is intended to be incorporated here and/or referred to for additional understanding, support and teachings of the end-effectors 210 and 210' of FIGS. 6A-6D. FIGS. 6A-6C illustrate end-effector 210 comprising support platform 214, a gripper assembly 220 comprising first gripper 222*a* and second gripper 222*b*, and a negative pressure system 240 comprising at least one suction asset (e.g., see suction asset 242, with an array of suction assets also being contemplated) and at least one pressure generator 260 (negative pressure generator) in fluid communication with fluid passageway 250 and thus an interior volume of the suction asset 242. In some examples, the end-effector 210 can further comprise a magnet or magnet system 280 (e.g., see first and second magnets 280*a* and 280*b* supported by the support platform 214 to be within the interior volume of the suction asset 242, and disposed on opposing sides of the fluid passageway 250). In the example shown, the negative pressure system 240 comprises a single suction asset 242 supported by and from a lowermost surface (e.g., a palm) of the support platform 214 so as to extend at least partially within a gripping region (e.g., see gripping region shown in dotted lines in FIG. 6B), and so as to locate a suction plane at or within the gripping region. The end-effector 210 can further comprise, and more specifically the gripper assembly 220 can comprise and be operable with, one or more actuators 239 operable to facilitate and cause movement of the first and second grippers 222*a* and 222*b* relative to the support platform 214. In one aspect, the gripper assembly 220 can comprise an underactuated type of gripper assembly, meaning that the first and second grippers are actuatable in their respective degrees of freedom with less actuators than degrees of freedom. This will depend upon the kinematic configuration of the various joints and associated degrees of freedom in the first and second grippers 222*a* and 222*b*. In another aspect, the gripper assembly 220 can comprise a plurality of actuators, each operable to effectuate movement of a corresponding degree of freedom within an associated gripper. The end-effector 210 illustrates an underactuated gripper assembly 220 as one or two actuators can be supported by the support platform 214, coupled to the first and second grippers 222*a* and 222*b*, and used to actuate all of the degrees of freedom within each of the first and second grippers 222*a* and 222*b*. For example, a single actuator can be operably coupled with the second gripper 222*b*, such that the actuator rotates the proximal segment 223*b* relative to the support platform 214 (a first degree of freedom) and the distal segment 225*b* relative to the proximal segment 223*b* (a second degree of freedom) in accordance with the kinematic configuration of the second gripper 222*b*. Notably, each of the first and second grippers 222*a* and 222*b* can comprise one or more structural members and one or more joints connecting the one or more structural members that can be configured so as to facilitate the positioning of the first and second grippers 222*a* and 222*b* at a position behind (i.e., aft of, above, etc. depending upon the orientation of the end-effector in three-dimensional space) the suction plane of the suction asset 242 (e.g., see FIG. 6B showing the first and second grippers 222*a* and 222*b* positioned in a retracted position behind the suction plane along the Z axis, which suction plane in this case is located at the interface of the suction asset 242 and the object A). Configuring the end-effector 210 to comprise a gripper assembly 220 capable of being retracted and positioned behind the suction plane of the suction asset 242 allows the end-effector 210 to deploy and active the negative pressure system 240 to grasp and manipulate the object A without either of the first and second grippers 222*a* and 222*b* interfering with the suction asset 242 as they are located behind the suction plane, and therefore behind and out of the way of the object A being grasped upon being engaged by the suction asset 242. The same can be said of the magnet or magnet system 280, if present.

FIG. 6B illustrates the end-effector 210 in a negative pressure manipulation configuration to grasp the object A, with the gripper assembly 220 inactive and the negative pressure system 240 active. FIG. 6B further illustrates the end-effector 210 in a magnetic manipulation configuration (if a magnet or magnet system is present) and/or a negative pressure manipulation configuration. FIG. 6C illustrates the end-effector 210 in at least one of a mechanical grip configuration, a negative pressure manipulation configuration, or a magnetic manipulation configuration to grasp the object.

Figure 6D:
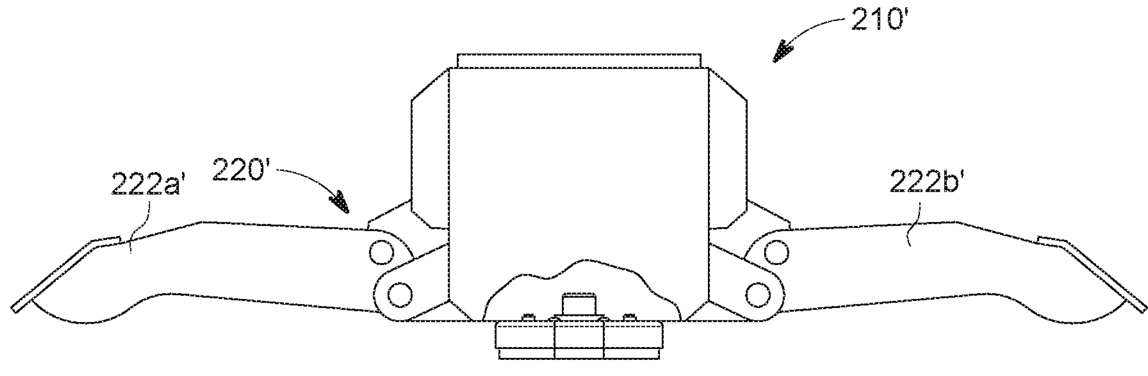
FIG. 6D illustrates a side view of a specific multi-function robotic end-effector in accordance with an example of FIG. 1, the multi-function robotic end effector comprising a negative pressure system and a gripper assembly, and optionally a magnet or magnet system, the gripper assembly comprising another two gripper opposable gripper arrangement.

FIG. 6D illustrates an alternative design of the end-effector 210 of FIGS. 6A-6C. In FIG. 6D, the end-effector 210' can be configured substantially similar to the end-effector 210. However, as shown, the end-effector 210' can comprise a gripper assembly 220' having first and second grippers 222*a*' and 222*b*' comprising structural members and associated joints, with the first and second grippers 222*a*' and 222*b*' having less degrees of freedom than the first and second grippers 222*a* and 222*b* of the end-effector 210 of FIGS. 6A-6C. In this case, the first and second grippers 222*a*' and 222*b*' each comprise a single degree of freedom (rotation of the single segment of the respective grippers relative to the support platform 214). End-effector 210' illustrates that an end-effector having a two gripper opposable gripper arrangement can be configured in a number of different ways, and that those specifically shown herein are not intended to be limiting in any way.

Figure 7A:
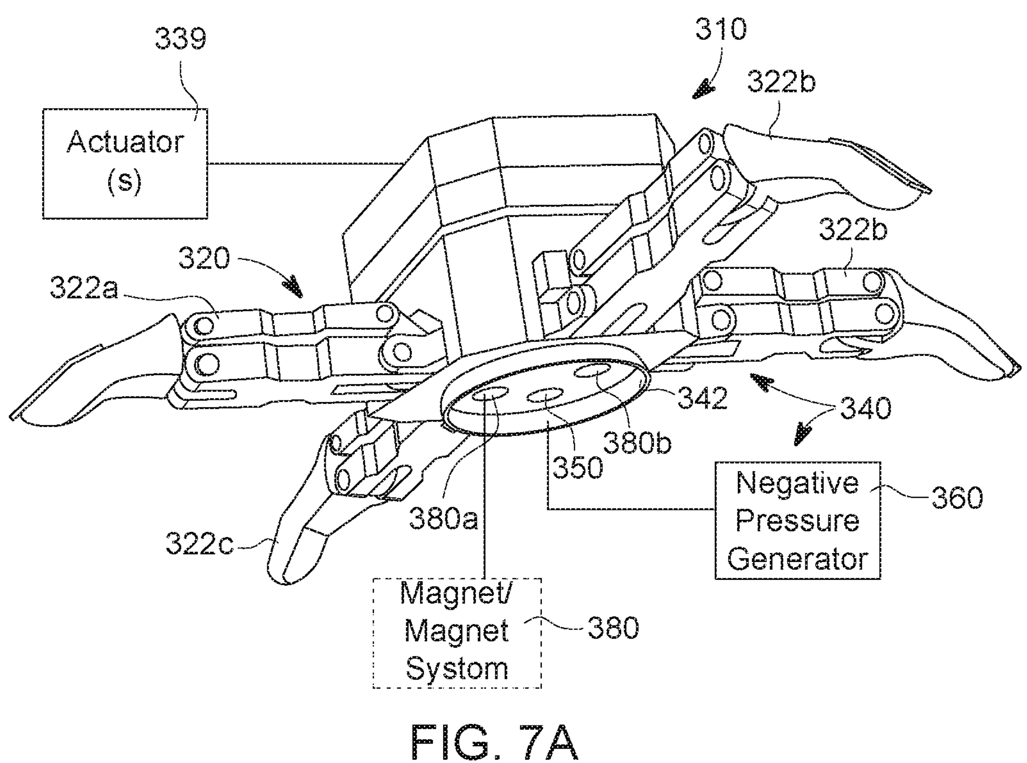
FIG. 7A illustrates a perspective view of a specific multi-function robotic end-effector in accordance with an example of FIG. 1, the multi-function robotic end effector comprising a negative pressure system and a gripper assembly, and optionally a magnet or magnet system, the gripper assembly comprising a four gripper opposable gripper arrangement.
Figure 7B:
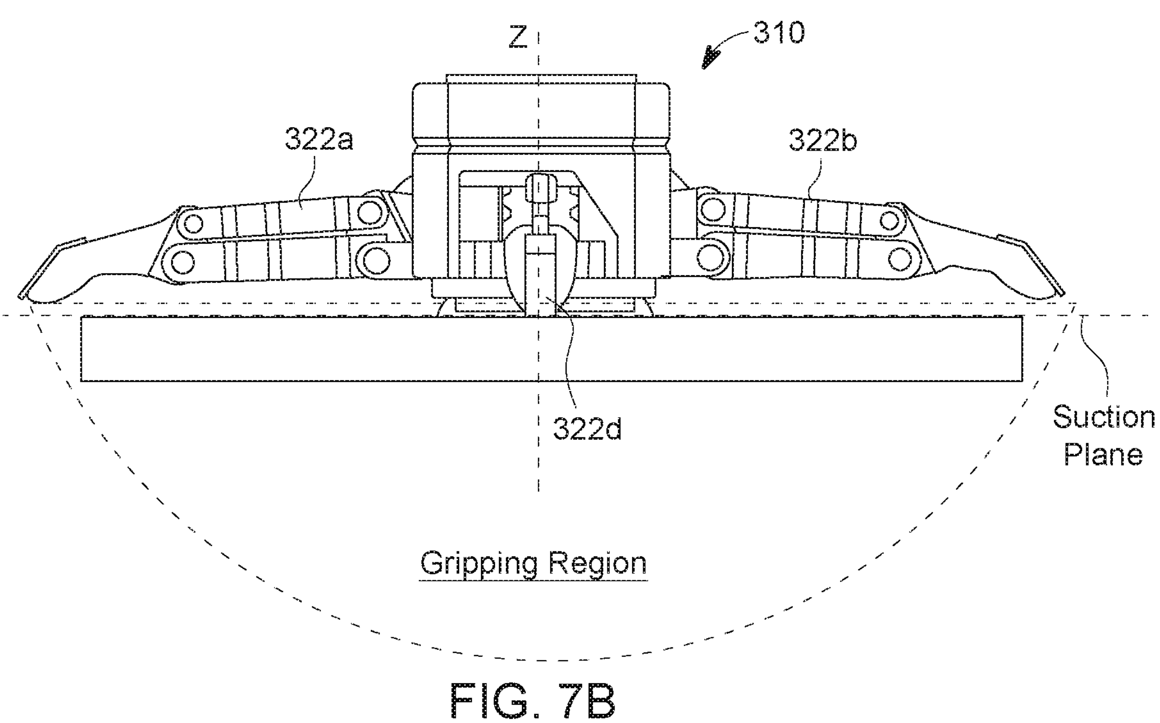
FIG. 7B a side view of the multi-function robotic end-effector of FIG. 7A, with the gripper assembly retracted, and the multi-function robotic end-effector in at least one of a negative pressure manipulation configuration or a magnetic manipulation configuration.

With reference to FIGS. 7A-6B, illustrated is another specific, example multi-functional robotic end effector 310 having a four gripper opposable gripper arrangement based on the various examples of the multi-functional robotic end effector 10 set forth in FIG. 1. As such, the above discussion of FIG. 1 is intended to be incorporated here and/or referred to for additional understanding, support and teachings of the end-effector 310 of FIGS. 7A-7B. The end-effector 310 comprises a support platform 314, a gripper assembly 320 comprising first gripper 322*a*, a second gripper 322*b*, a third gripper 322*c*, and a fourth gripper 322*d*. The first and second grippers 322*a* and 322*b* oppose one another, with the third and fourth grippers 322*c* and 322*d* opposing one another. The end-effector 310 can further comprise a negative pressure system 340 comprising at least one suction asset (e.g., see suction asset 342, with an array of suction assets also being contemplated) and at least one pressure generator 360 (negative pressure generator) in fluid communication with a fluid passageway 350, and thus an interior volume of the suction asset 342. In some examples, the end-effector 310 can further comprise a magnet or magnet system 380 (e.g., see first and second magnets 380*a* and 380*b* supported by the support platform 314 to be within the interior volume of the suction asset 342 on opposing sides of the fluid passageway 350). In the example shown, the negative pressure system 340 comprises a single suction asset 342 supported by and from a lowermost surface (e.g., a palm) of the support platform 314 so as to extend at least partially within a gripping region (e.g., see gripping region shown in dotted lines in FIG. 7B), and so as to locate a suction plane at or within the gripping region. The end-effector 310 can further comprise, and more specifically the gripper assembly 320 can comprise and be operable with, one or more actuators 339 operable to facilitate and cause movement of the first, second, third and fourth grippers 322*a*, 322*b*, 322*c*, and 322*d* relative to the support platform 314. In one aspect, the gripper assembly 320 can comprise an underactuated type of gripper assembly, meaning that the first, second, third and fourth grippers 322*a*, 322*b*, 322*c*, and 322*d* are actuatable in their respective degrees of freedom with less actuators than degrees of freedom. This will depend upon the kinematic configuration of the various joints and associated degrees of freedom in the first, second, third and fourth grippers 322*a*, 322*b*, 322*c*, and 322*d*. In another aspect, the gripper assembly 320 can comprise a plurality of actuators, each operable to effectuate movement of a corresponding degree of freedom within an associated gripper. The end-effector 310 illustrates an underactuated gripper assembly 320 as two or four actuators can be supported by the support platform 314, and coupled to respective first, second, third and fourth grippers 322*a*, 322*b*, 322*c*, and 322*d* (e.g., a single actuator operable to actuate first and second grippers 322*a* and 322*b*, or two respective actuators associated with each of these (and likewise for the third and fourth grippers 322*c* and 322*d*)), and used to actuate all of the degrees of freedom within each of the first, second, third and fourth grippers 322*a*, 322*b*, 322*c*, and 322*d*. For example, a single actuator can be operably coupled with the second gripper 322*b*, such that the actuator rotates the proximal segment 323*b* relative to the support platform 314 (a first degree of freedom) and the distal segment 325*b* relative to the proximal segment 323*b* (a second degree of freedom) in accordance with the kinematic configuration of the second gripper 322*b*. Notably, each of the first, second, third and fourth grippers 322*a*, 322*b*, 322*c*, and 322*d* can comprise one or more structural members and one or more joints connecting the one or more structural members that can be configured so as to facilitate the positioning of the first, second, third and fourth grippers 322*a*, 322*b*, 322*c*, and 322*d* at a position behind (i.e., aft of, above, etc. depending upon the orientation of the end-effector in three-dimensional space) the suction plane of the suction asset 342 (e.g., see FIG. 7B showing the first, second, and fourth grippers 322*a*, 322*b*, and 322*d* positioned in a retracted position behind the suction plane along the Z axis, which suction plane in this case is located at the interface of the suction asset 342 and the object A). Configuring the end-effector 310 to comprise a gripper assembly 320 capable of being retracted and positioned behind the suction plane of the suction asset 342 allows the end-effector 310 to deploy and active the negative pressure system 340 to grasp and manipulate the object A without either of the first, second, third and fourth grippers 322*a*, 322*b*, 322*c*, and 322*d* interfering with the suction asset 342 as they are located behind the suction plane, and therefore behind and out of the way of the object A being grasped upon being engaged by the suction asset 342. The same can be said of the magnet or magnet system 380, if present.

FIG. 7B illustrates the end-effector 310 in a negative pressure manipulation configuration to grasp the object A, with the gripper assembly 320 inactive and the negative pressure system 340 active. FIG. 7B further illustrates the end-effector 310 in a magnetic manipulation configuration (if a magnet or magnet system is present) and/or a negative pressure manipulation configuration. Although not shown, the end-effector 310 can further be operated in at least one of a mechanical grip configuration, a negative pressure manipulation configuration, or a magnetic manipulation configuration to grasp the object A.

Although not shown, it will be apparent that the end-effector 310 can be configured such that the gripper assembly 320 comprises first, second, third and fourth grippers 322*a*, 322*b*, 322*c*, and 322*d* comprising structural members and associated joints, and less degrees of freedom than shown in FIGS. 7A-7B. For example, the first, second, third and fourth grippers 322*a*, 322*b*, 322*c*, and 322*d* can each comprise a single degree of freedom (rotation of the single segment of the respective grippers relative to the support platform 314). As such, it will be apparent that an end-effector having a four gripper opposable gripper arrangement can be configured in a number of different ways, and that those specifically shown herein are not intended to be limiting in any way.

Figure 8:
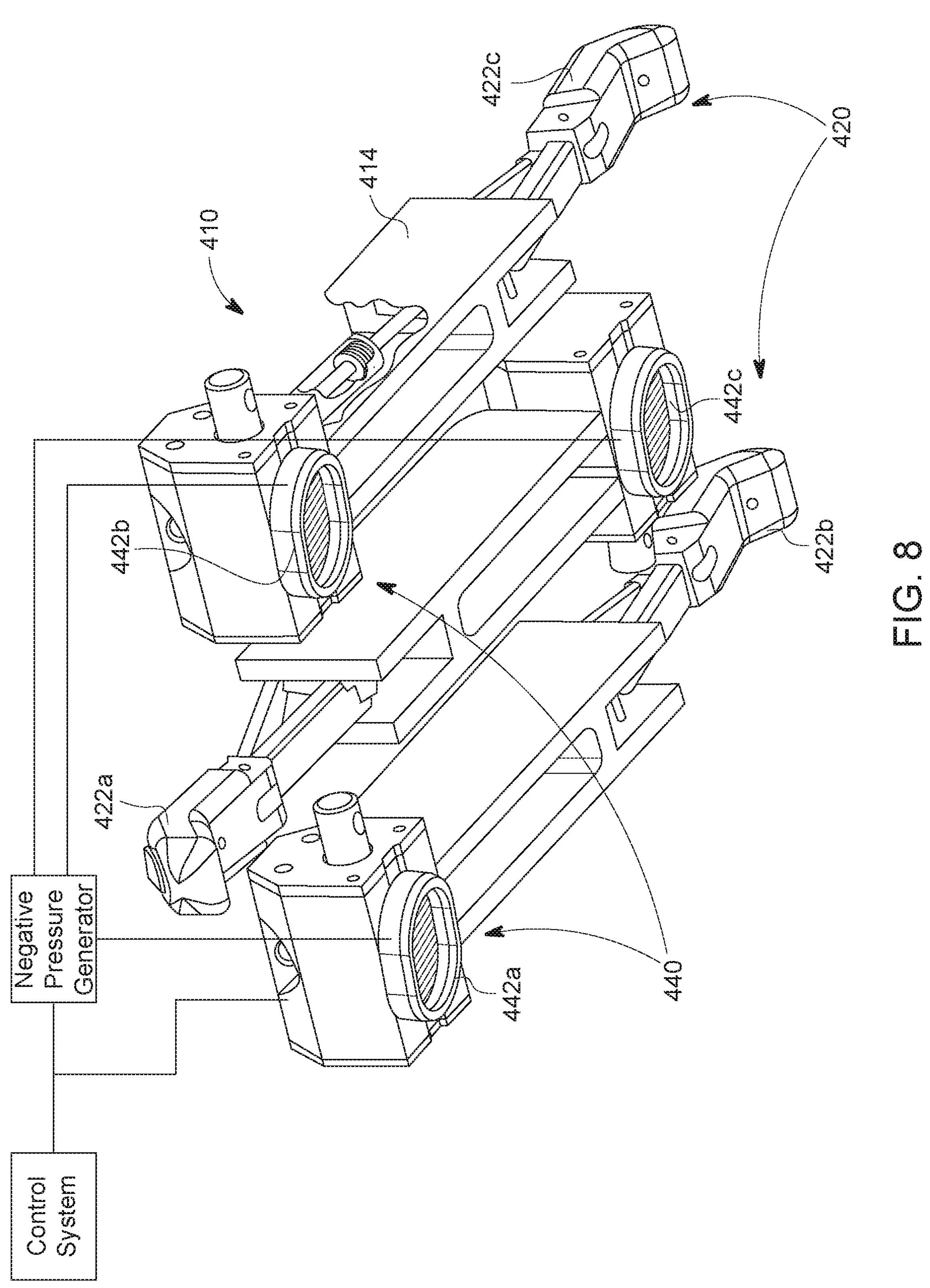
FIG. 8 illustrates a perspective view of a multi-function robotic end-effector with both a negative pressure system and a gripper assembly in accordance with an example of FIG. 1, and shown with the grippers in a retracted configuration and the end-effector in a negative pressure manipulation configuration, as well as with the suction assets of the negative pressure system located outside a gripping region of the gripper assembly.
Figure 9:
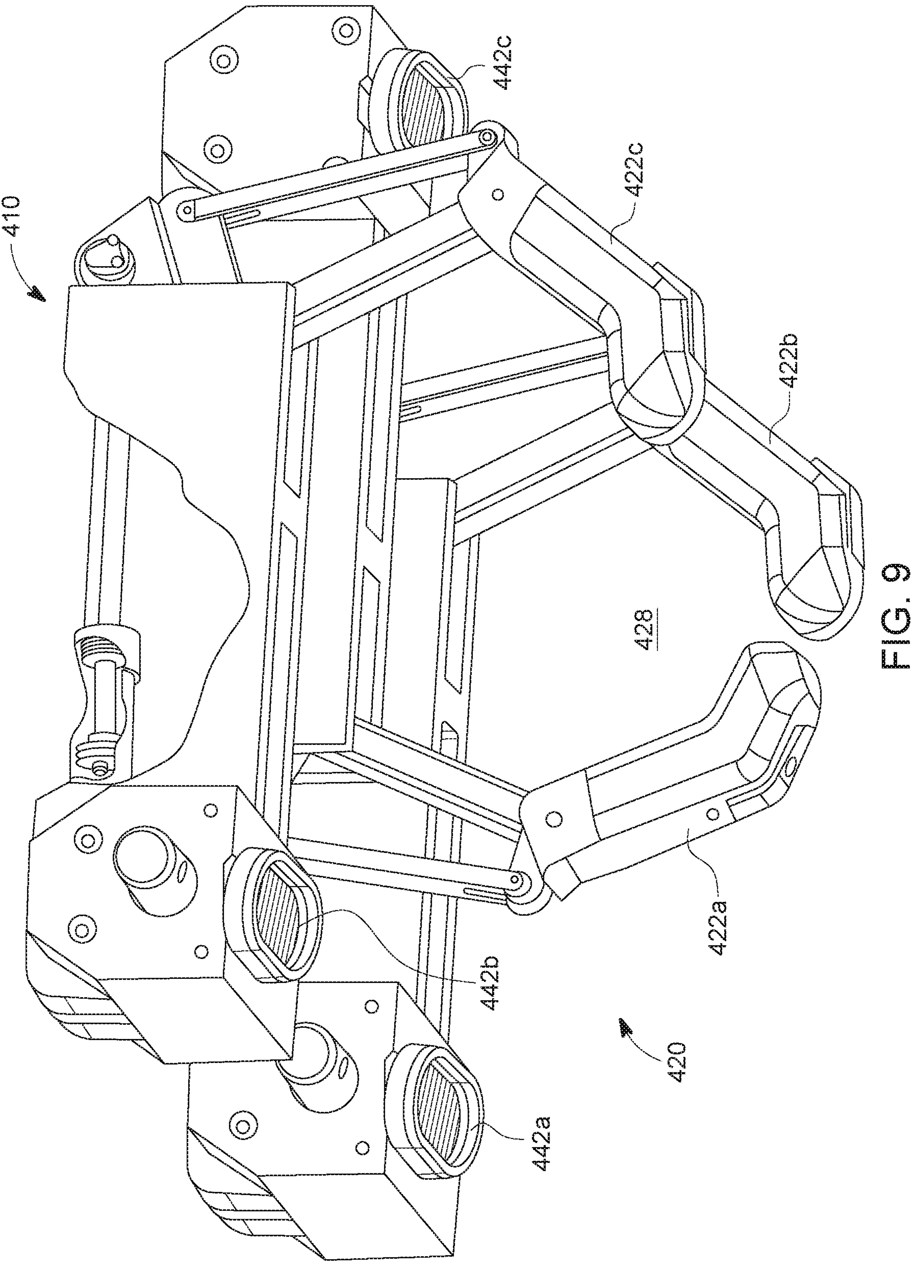
FIG. 9 illustrates a perspective view of the multi-function robotic end-effector of FIG. 8 shown with the grippers in a deployed or grip configuration and the end-effector in a mechanical grip configuration and/or a negative pressure manipulation configuration.

With reference to FIGS. 8-9, illustrated is another specific, example multi-functional robotic end effector 410 having a three gripper opposable gripper arrangement and one or more suction assets operable outside a gripping region of the gripper assembly, the multi-functional robotic end effector 410 being based on the various examples of the multi-functional robotic end effector 10 set forth in FIG. 1. As such, the above discussion of FIG. 1 is intended to be incorporated here and/or referred to for additional understanding, support and teachings of the end-effector 410 of FIGS. 8-9. The end-effector 410 is also similar to the end-effector 110 discussed above with respect to FIGS. 2-3, and as such, the above discussion can be referred to for additional understanding. However, in this example, the end-effector 410 comprises a negative pressure system 440 comprising one or more negative pressure generators, and one or more suction assets (see first, second, and third suction assets 442*a*, 442*b*, and 442*c*) supported from the support platform 414, and located outside of a gripping region 428 of the gripper assembly 420. The gripper assembly 420 can comprise opposable grippers 422*a*, 422*b*, and 422*c*. The gripper assembly 420 and the negative pressure system 440 can be configured and can function in accordance with the discussion above with respect to FIG. 1.

Figure 10:
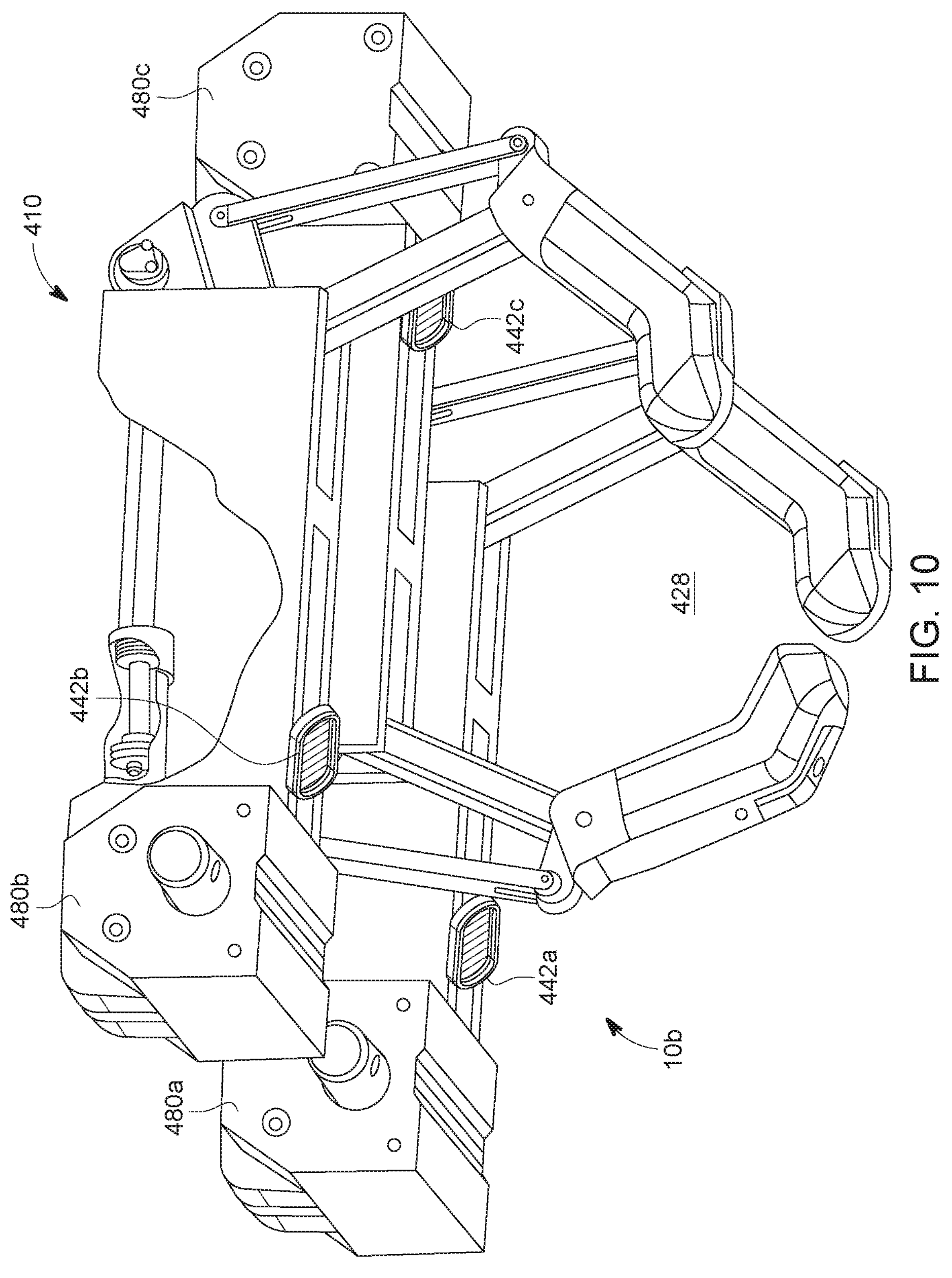
FIG. 10 illustrates a perspective view of a multi-functional robotic end-effector having a negative pressure system having multiple suction assets, a gripper assembly having multiple grippers, and a magnet/magnetic system in accordance with an example of FIG. 1, and shown with the grippers in a deployed or grip configuration and the end-effector in a mechanical grip configuration, and at least one of a negative pressure manipulation configuration or a magnetic manipulation configuration, as well as with the suction assets of the negative pressure system located outside a gripping region of the gripper assembly.
Figure 11:
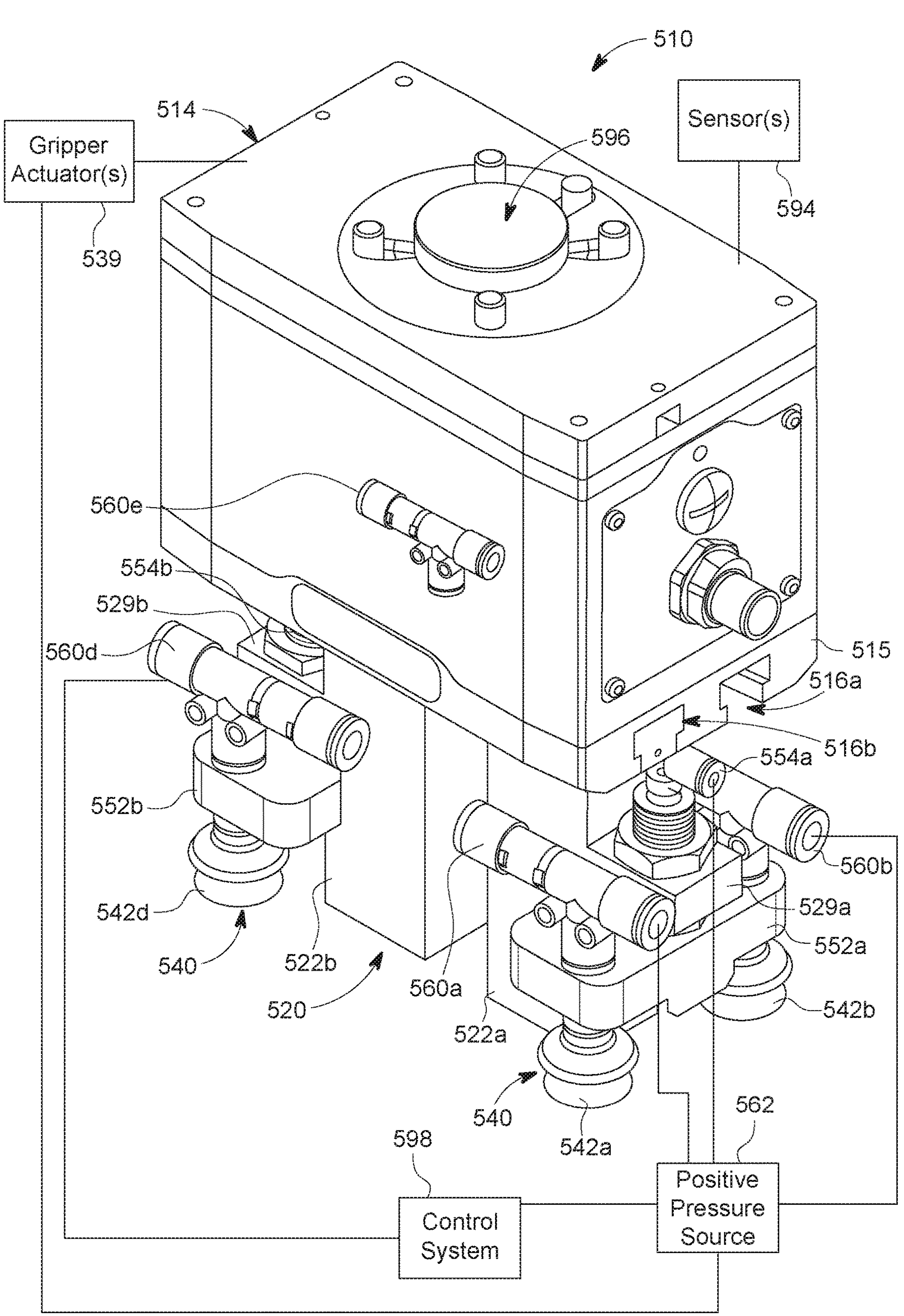
FIG. 11 illustrates a perspective view of a specific example of a multi-function robotic end-effector having a negative pressure system having multiple suction assets, and a gripper assembly having multiple grippers in a parallel-jaw gripper arrangement in accordance with an example of FIG. 1, and shown with suction assets positioned or located outside of a gripping region of the gripper assembly.
Figure 12:
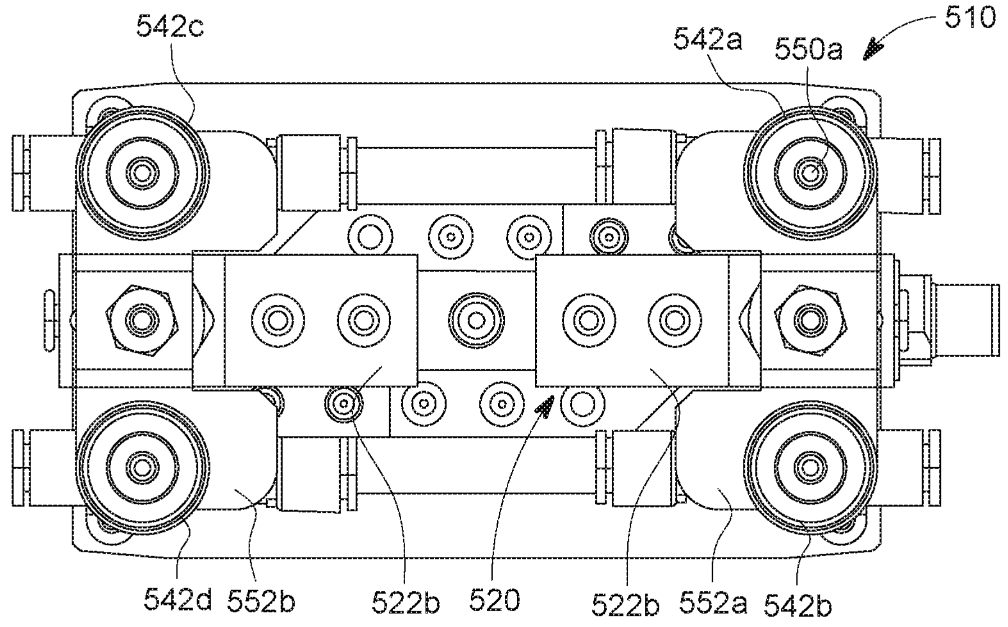
FIG. 12 illustrates a bottom view of the multi-function robotic end-effector of FIG. 11.
Figure 13:
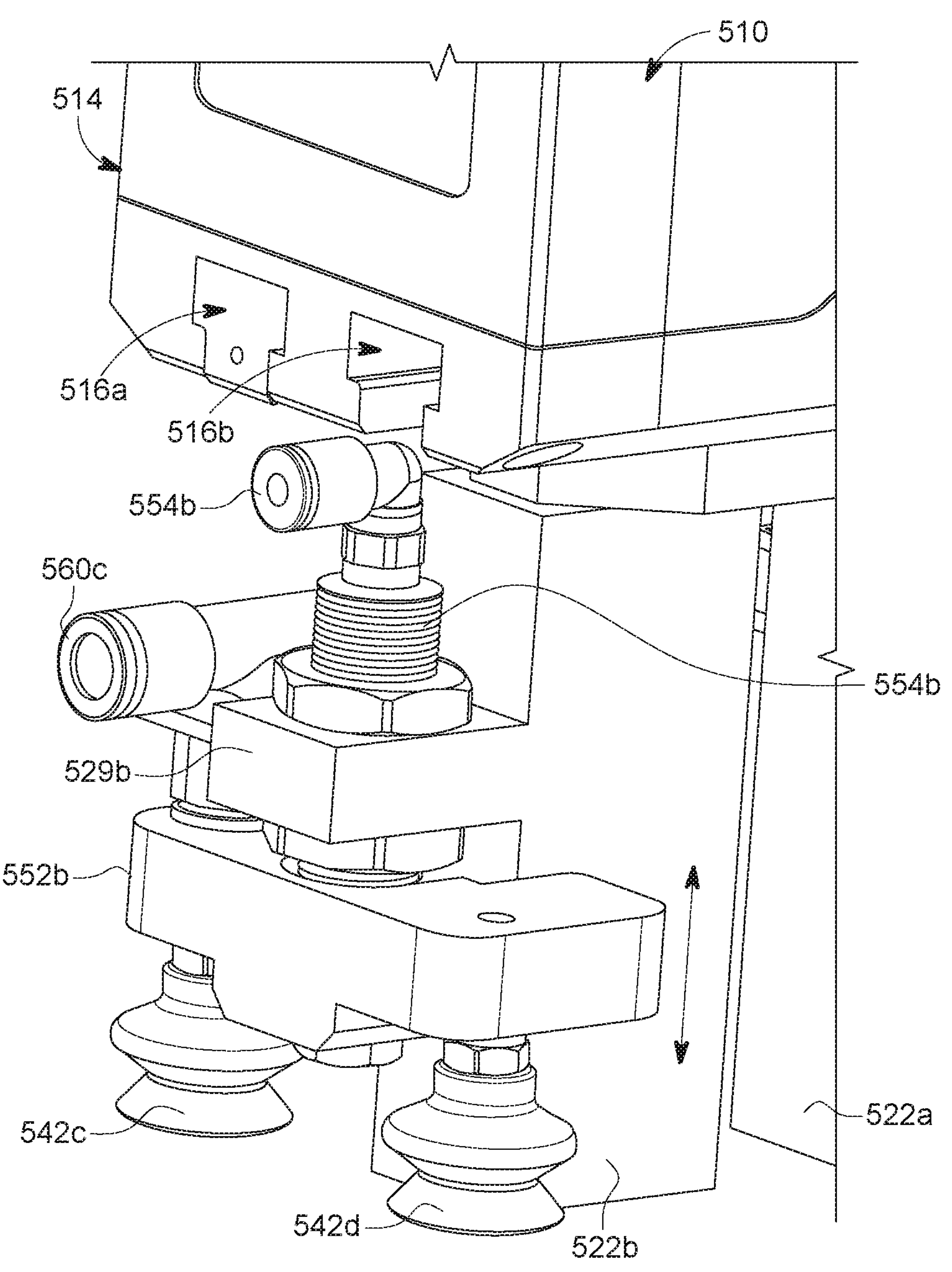
FIG. 13 illustrates a partial perspective view of the multi-function robotic end-effector of FIG. 11.
Figure 14:
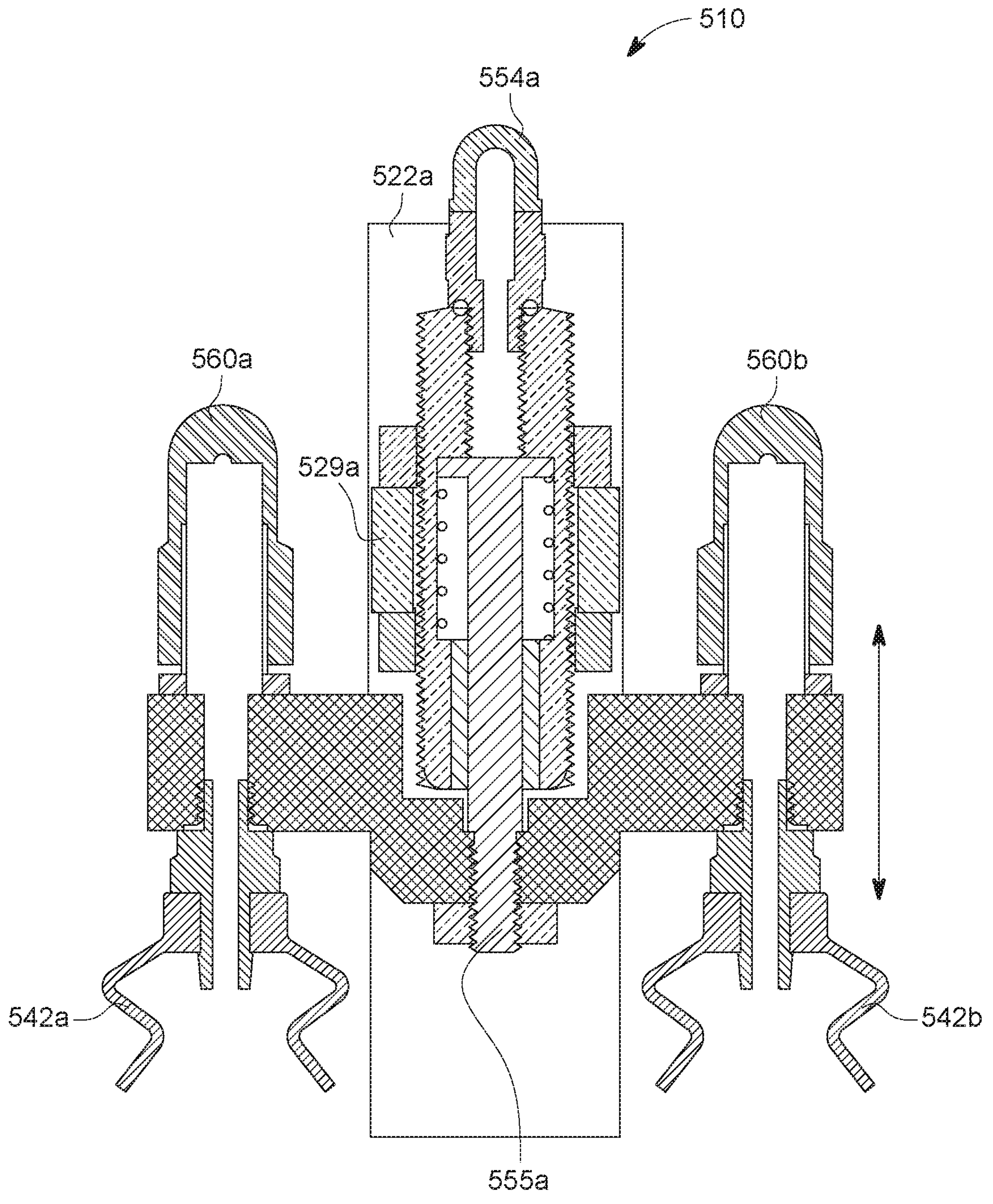
FIG. 14 illustrates a partial cross-section view of the multi-function robotic end-effector of FIG. 11.
Figure 15:
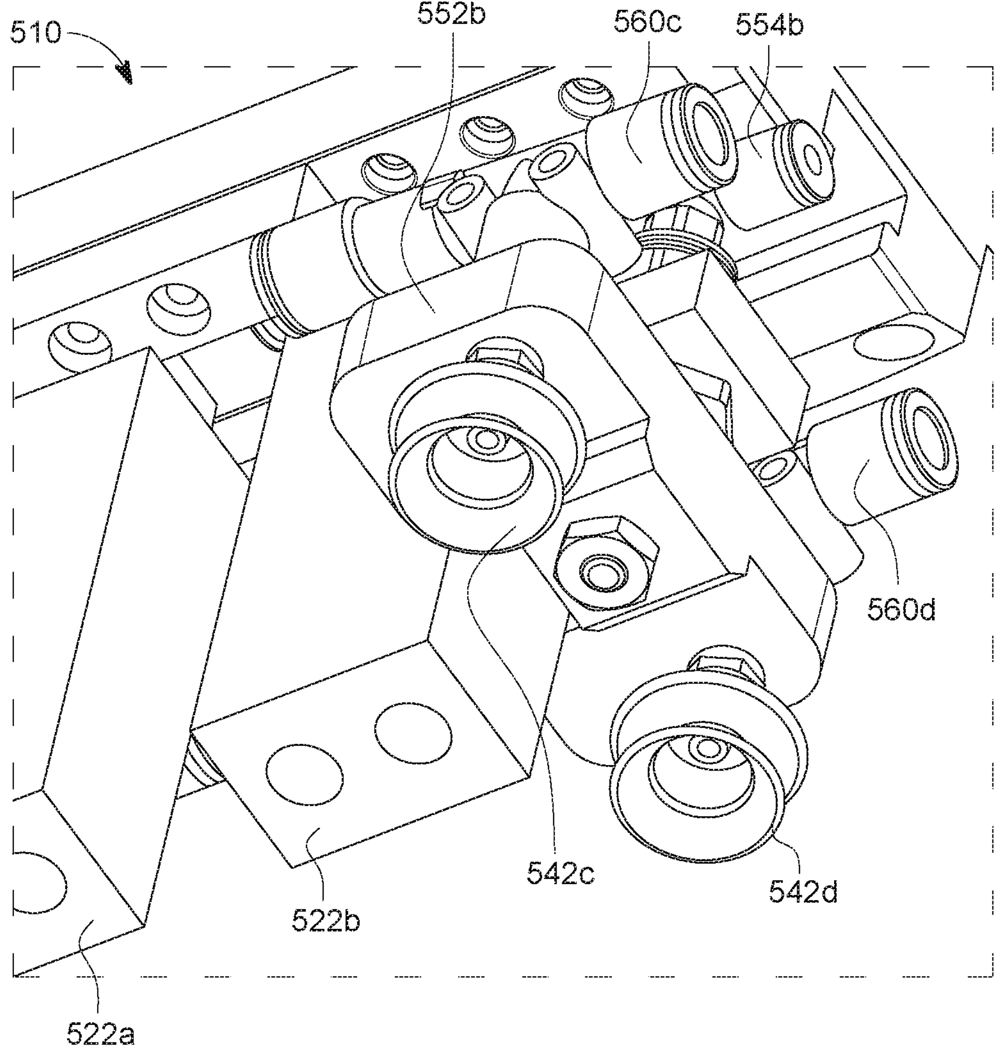
FIG. 15 illustrates a partial bottom perspective view of the multi-function robotic end-effector of FIG. 11.
Figure 16:
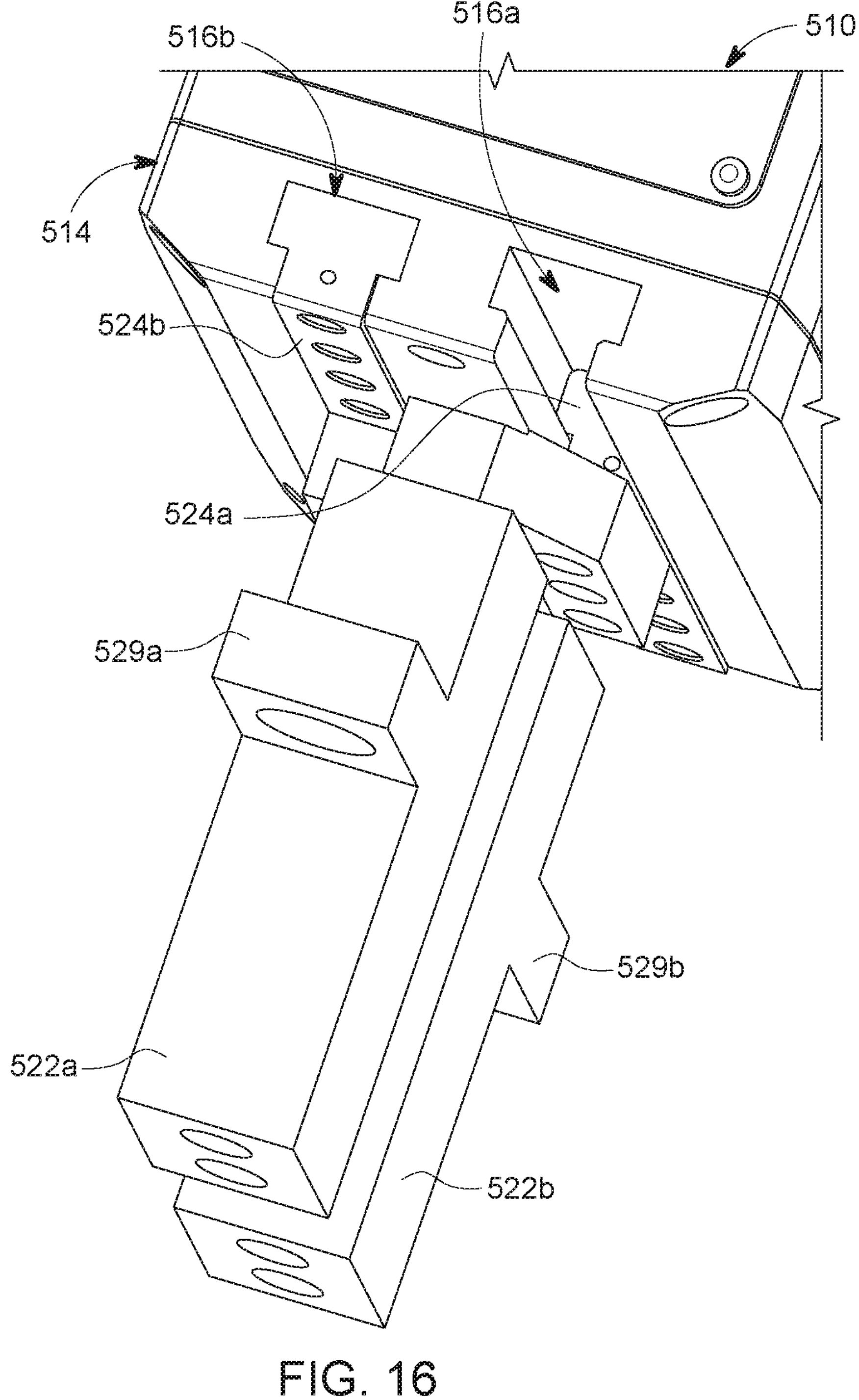
FIG. 16 illustrates a partial perspective view of the multi-function robotic end-effector of FIG. 11.

With reference to FIG. 10, illustrated is the end-effector 410 further comprising one or more magnets or magnet assemblies (e.g., see magnet systems 480*a*, 480*b*, and 480*c*) supported from the support platform 414. These too can be functional or operational outside the gripping region 428 of the gripper assembly 420. Moreover, these can comprise a lower surface that is coplanar with a suction plane defined by the first, second, and third suction assets 442*a*, 442*b*, and 442*c*. The one or more magnets or magnet systems can be configured and can function as described herein with respect to FIG. 1.

With reference to FIGS. 11-18, illustrated are specific, example multi-functional robotic end effectors 510, 510', each having a two gripper opposable gripper arrangement in the form of a parallel-jaw gripper arrangement, and one or more suction assets operable outside a gripping region of the gripper assembly, the multi-functional robotic end effectors 510, 510' each being based on some of the various examples of the multi-functional robotic end effector 10 set forth in FIG. 1. As such, the above discussion of FIG. 1 is intended to be incorporated here and/or referred to for additional understanding, support and teachings of the end-effectors 510, 510' of FIGS. 11-18. Referring specifically to FIGS. 11-17, the end-effector 510 comprises a support platform 514 comprising a housing or body. The housing comprises a wall structure defining an interior volume, wherein the housing conceals various components of the end-effector 510. The support platform 514 comprises a lower surface 515 having first and second channels 516 and 517, respectively, formed therein.

The end-effector 510 can further comprise a gripper assembly 520 comprising a two gripper opposable gripper arrangement supported from the support platform and having first and second opposable grippers, at least one gripper being actuatable in at least one degree of freedom. In this example, both the first and second grippers are actuatable and moveable relative to the support platform 514 and one another in a translational degree of freedom, wherein they move toward and away from one another upon being actuated. The first and second grippers 522*a* and 522*b* can each be moveable within a common plane. The gripper assembly 520 can further comprise a support platform interface operable to moveably couple the first and second grippers 522*a*, 522*b* to the support platform 514. As shown, the support platform interface can comprise a first slide member 524*a* operable to slidably couple the first gripper 522*a* to the support platform 514, and a second slide member 524*b* operable to slidably couple the second gripper 522*b* to the support platform 514. The first and second slide members 524*a*, 524*b* can comprise a structural portion sized and configured so as to be slidably disposed within and retained by the first and second channels 516 and 517, respectively. In addition, the first and second slide members 524*a*, 524*b* can comprise a structural portion sized and configured so as to couple the first and second grippers 522*a*, 522*b* to the support platform interface. In another example, the first and second slide members 524*a*, 524*b* can be integrally formed with the first and second grippers 522*a*, 522*b*, respectively. The first and second slide member 524*a*, 524*b* can be operably coupled to one or more gripper actuators 539 supported by the support platform 514. The one or more gripper actuators 539 can comprise any type of actuator and actuator arrangement operable to act on the first and second slide members 524*a*, 524*b* to cause them (and the first and second grippers 522*a*, 522*b* supported thereby) to move in a bi-directional manner relative to the support platform 514 to perform the intended gripping function of the gripper assembly 520 of the end-effector 510.

The first and second grippers 522*a*, 522*b* can each further comprise an actuator support (i.e., a base, a platform, etc.) (e.g., see first actuator support 529*a* of the first gripper 522*a*, and the second actuator support 529*b* of the second gripper 522*b*). The first and second actuator supports 529*a*, 529*b* can facilitate the mounting and coupling of first and second actuators of the negative pressure system to the first and second grippers 522*a*, 522*b*, respectively, as described below. In one aspect, the first and second actuator supports 529*a*, 529*b* can be coupled to the first and second grippers 522, 522*b*, respectively. In another aspect, the first and second actuator supports 529*a*, 529*b* can be integrally formed with the first and second grippers 522*a*, 522*b*. The first and second actuator supports 529*a*, 529*b* can each further comprise an actuator interface, which in this example comprises a hole formed through each of the first and second actuator mounts 529*a*, 529*b* sized and configured to receive and support an actuator, again as described below.

The end-effector 510 can further comprise a negative pressure system 540 operable to facilitate the generation of a negative pressure to be applied to an object for grasping and manipulating the object via the negative pressure. The negative pressure system 540 can comprise one or more suction assets, each of the one or more suction assets comprising an object interfacing component comprising an interfacing surface operable to engage and interface with an object to be grasped. In one example, the negative pressure system 540 can comprise a plurality of suction assets (e.g., see suction assets 542*a*, 542*b*, 542*c*, and 542*d*). Each of the one or more suction assets can define a suction plane. In addition, a plurality of suction assets (e.g., the suction assets 542*a*, 542*b*, 542*c*, and 542*d*) can collectively define a suction plane.

The negative pressure system 540 can further comprise one or more negative pressure generators in fluid communication with the one or more suction assets. As shown, the end-effector 510 comprises a plurality (an array) of negative pressure generators operable with a plurality (an array) of suction assets positioned outside a gripping region of the gripper assembly 520. Specifically, in the example shown, the end-effector 510 comprises first, second, third, and fourth suction assets 542*a*, 542*b*, 542*c*, and 542*d*, each operable with first, second, third, and fourth negative pressure generators 560*a*, 560*b*, 560*c*, and 560*d*, respectively. In one aspect, as shown, the first, second, third, and fourth negative pressure generators 560*a*, 560*b*, 560*c*, and 560*d* can each comprise a venturi vacuum system comprising a venturi vacuum device in fluid communication with a positive pressure source 562 operable to supply a motive fluid to the venturi vacuum device to generate a negative pressure within a suction asset associated with the venturi vacuum device. A single positive pressure source can supply a motive fluid to each of the venturi vacuum devices. Alternatively, each venturi vacuum device can be associated with and in fluid communication with a separate and independent positive pressure source. The positive pressure source 562 can be operable via a controller represented by the control system 598. In another aspect, as discussed below, the one or more negative pressure generators associated with the one or more suction assets can comprise one or more vacuum pumps.

The one or more suction assets (e.g., the first, second, third, and fourth suction assets 542*a*, 542*b*, 542*c*, and 542*d*) can be moveably supported from the gripper assembly 520, in this example the first and second grippers 522*a*, 522*b*, such that the suction assets are actuatable and positionable in multiple elevations relative to at least the gripper assembly 520 and likely also the support platform 514. As such, the one or more suction assets can be moveably coupled to the gripper assembly 520. As shown, the first, second, third, and fourth suction assets 542*a*, 542*b*, 542*c*, and 542*d* can be mounted or otherwise coupled to or supported by a respective mount. The negative pressure system 540, as shown, can comprise a first mount 552*a* moveably supported relative to the first gripper 522*a*, and a second mount 552*b* moveably supported relative to the second gripper 522*b*. The first and second suction assets 542*a*, 542*b* can be supported on the first mount 552*a*, and the third and fourth suction assets 522*c*, 522*d* can be supported on the second mount 552*b*. Each of the first and second mounts 552*a*, 552*b* can be moveably coupled to the first and second grippers 522*a*, 522*b*, respectively, via first and second actuators 554*a*, 554*b*, such that the first and second mounts 552*a*, 552*b* and the associated suction assets supported thereon are displaceable relative to the first and second grippers 522*a*, 522*b*, respectively, wherein the first and second mounts 552*a*, 552*b*, and particularly the associated suction assets of the first, second, third, and fourth suction assets 542*a*, 542*b*, 542*c*, and 542*d* that are supported thereon, are moveable to a retracted position and a deployed position via actuation of the first and second actuators 554*a*, 554*b*. In the deployed position, the first, second, third, and fourth suction assets 542*a*, 542*b*, 542*c*, and 542*d* can be caused to extend below a lowermost surface of the first and second grippers 522*a*, 522*b* where they are in position to come into contact with an object to be grasped upon activation of the associated negative pressure generators to generate a negative pressure within the first, second, third, and fourth suction assets 542*a*, 542*b*, 542*c*, and 542*d*. In one example, as shown, the first and second actuators 554*a*, 554*b* can each comprise a single acting air cylinder with spring return in fluid communication with a positive pressure source, such as the positive pressure source 562, which can be configured to be in fluid communication with the negative pressure generators (e.g., each of the venturi vacuum devices) and also the first and second actuators 554*a*, 554*b* via a system of fluid lines. Alternatively, the first and second actuators 554*a*, 554*b* can be in fluid communication and operable with a separate positive pressure source, or their own positive pressure sources.

The first actuator 554*a* can be mounted to the first actuator support 529*a* of the first gripper 522*a*, and also coupled to the first mount 552*a*. More specifically, the first actuator 554*a* can comprise an actuatable component (e.g., see the displaceable piston 555*a* in FIG. 14 actuatable via air pressure from a positive pressure source) that can be coupled to the first mount 552*a*, wherein actuation of the first actuator 554*a* to displace the actuatable component causes the first mount 552*a* (and the suction assets supported thereon) to likewise move or displace in a corresponding manner relative to the first gripper 522*a*. Likewise, the second actuator 554*b* can be mounted to the second actuator support 529*b* of the second gripper 522*b*, and also coupled to the second mount 552*b*. More specifically, the second actuator 554*b* can comprise an actuatable component (e.g., a displaceable piston similar to or the same as that of the first actuator 554*a*) that can be coupled to the second mount 552*b*, wherein actuation of the second actuator 554*b* to displace the actuatable component causes the second mount 552*b* (and the suction assets supported thereon) to likewise move or displace in a corresponding manner relative to the second gripper 522*b*. As indicated above, actuation of the first and second actuators 554*a*, 554*b* facilitates movement of the suction assets (e.g., first, second, third, and fourth suction assets 542*a*, 542*b*, 542*c*, and 542*d*) between a retracted position and a deployed position (see FIG. 17). Once in the deployed position, the negative pressure system, and particularly the negative pressure generators (e.g., the first, second, third, and fourth negative pressure generators 560*a*, 560*b*, 560*c*, and 560*d*) can be activated to generate a negative pressure within the suction assets (e.g., first, second, third, and fourth suction assets 542*a*, 542*b*, 542*c*, and 542*d*) to apply a negative pressure to the object (see object A2 in FIG. 17) sufficient to grasp, lift, move, or otherwise manipulate the object. Furthermore, the suction assets can be displaced a sufficient distance so that in the deployed position, the suction plane defined by the suction assets is below a lowermost surface of the first and second grippers 522*a*, 522*b*, and in this example, outside the gripping region of the first and second grippers 522*a*, 522*b* (see FIG. 17).

In one example, as shown, the one or more negative pressure generators (e.g., the first, second, third, and fourth negative pressure generators 560*a*, 560*b*, 560*c*, and 560*d*) can also be mounted to one of the first or second mounts 552*a*, 552*b*. The one or more negative pressure generators can be in fluid communication with the one or more suction assets (e.g., the first, second, third, and fourth negative pressure generators 560*a*, 560*b*, 560*c*, and 560*d* can be in fluid communication with the first, second, third, and fourth suction assets 542*a*, 542*b*, 542*c*, and 542*d*), for example, through the first and second mounts 552*a*, 552*b*. In other words, the first and second mounts 552*a*, 552*b* can comprise one or more through-holes (e.g., see example through-hole in second mount 552*b* in FIG. 13) operable to facilitate a fluid connection between the negative pressure generators and the corresponding suction assets supported on the respective first and second mounts 552*a*, 552*b*, and specifically between the fluid passageway of the one or more suction assets (e.g., see fluid passageway 550*a* of suction asset 542*a* in FIG. 12, with each of the other suction assets comprising a similar or the same type of fluid passageway) and the fluid passageways within the negative pressure generators. With the negative pressure generators mounted to the first and second mounts 552*a*, 552*b*, the negative pressure generators can be moveable with the movement or displacement of the first and second mounts 552*a*, 552*b*.

In another example, the first, second, third, and fourth negative pressure generators 560*a*, 560*b*, 560*c*, and 560*d* comprising a venturi vacuum device can be mounted at a location remote from the first and second mounts 552*a*, 552*b*, such as on the support platform 514 or any other suitable component of the end-effector 510, while still being in fluid communication with one or more suction assets. See, for example, the negative pressure generator 560*e* in the form of a venturi vacuum device mounted to the side of the support platform 514, which venturi vacuum device is shown to be in fluid communication with the first suction asset 542*a* via one or more fluid or vacuum lines and/or fluid couplings (it is noted that this would take place of the first negative pressure generator 560*a*). The negative pressure generator 560*e* is shown mounted to the support platform 514 by itself, however, this is merely to represent or convey that any one or all of the negative pressure generators of the end-effector 510 can be mounted at a remote location (remote to the mounts (552*a* and/or 552*b*) and configured to be in fluid communication with a respective suction asset.

The end-effector 510 can further comprise one or more sensors (e.g., see sensor(s) 594) operable with at least one of the gripper assembly 520, the negative pressure system 540, or any other component or system of the end-effector 510. The one or more sensors can comprise any type as discussed herein.

The end-effector 510 can further comprise a robotic arm interface 596 operable to facilitate the removeable coupling of the end-effector 510 to a robotic arm or another device or system. As such, the robotic arm interface 596 can comprise a mechanical interface or connection. In addition to the mechanical interface or connection, the robotic arm interface 596 can comprise at least one of a power interface or connection, a data interface or connection, or a fluid interface or connection (e.g., a hydraulic coupling, a pneumatic coupling, a positive and/or negative pressure source coupling).

Figure 17:
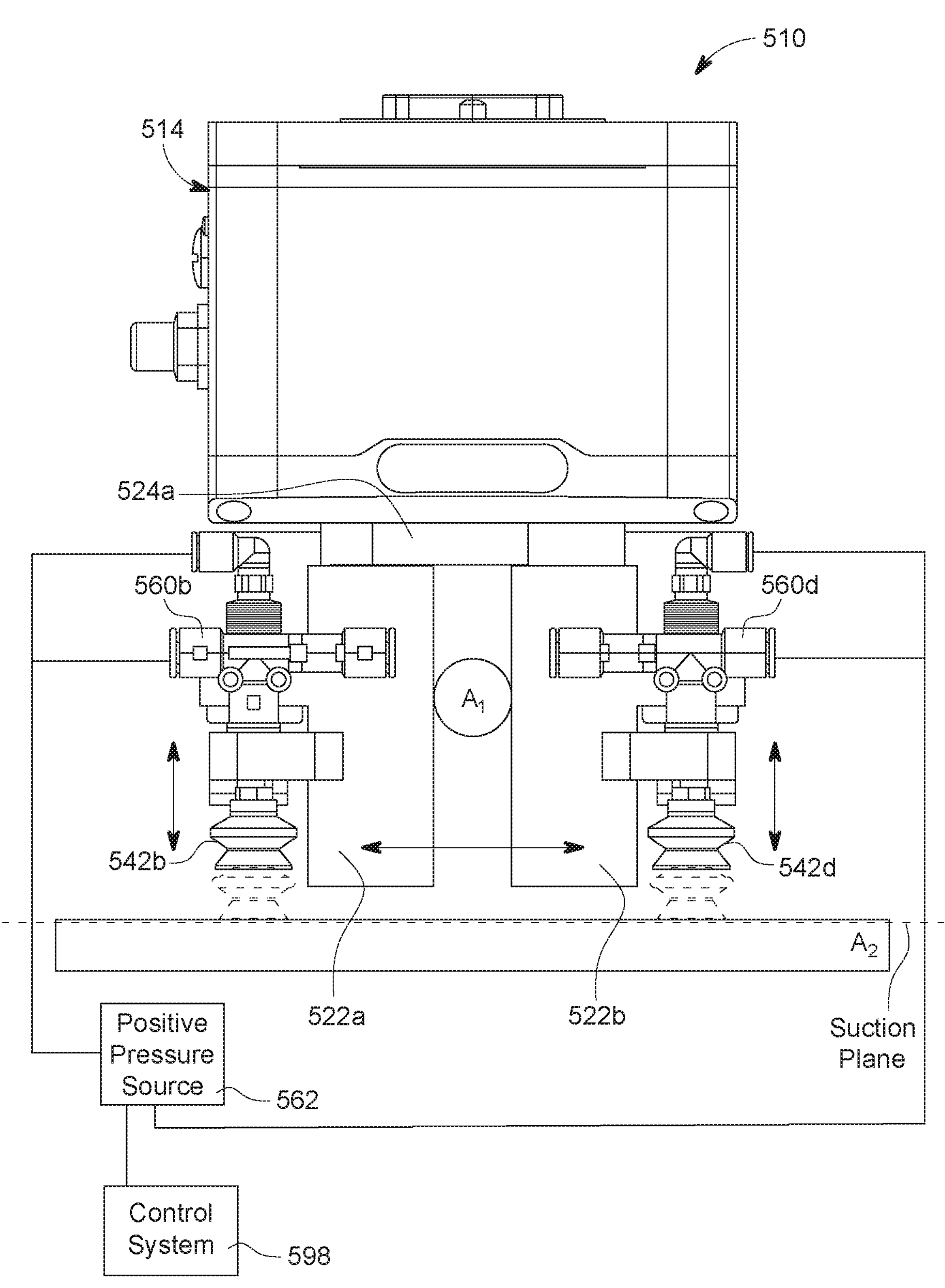
FIG. 17 illustrates a side view of the multi-function robotic end-effector of FIG. 11, with the multi-function robotic end-effector in a mechanical grip configuration, as well as a negative pressure manipulation configuration.

It is noted that the end-effector 510 can comprise a mechanical grip configuration in which the gripper assembly 520 is activated to grasp an object (e.g., see object A1 in FIG. 17). The end-effector 510 can further comprise a negative pressure manipulation configuration in which the negative pressure system 540 is activated to grasp an object (e.g., see object A2 in FIG. 17).

Figure 18:
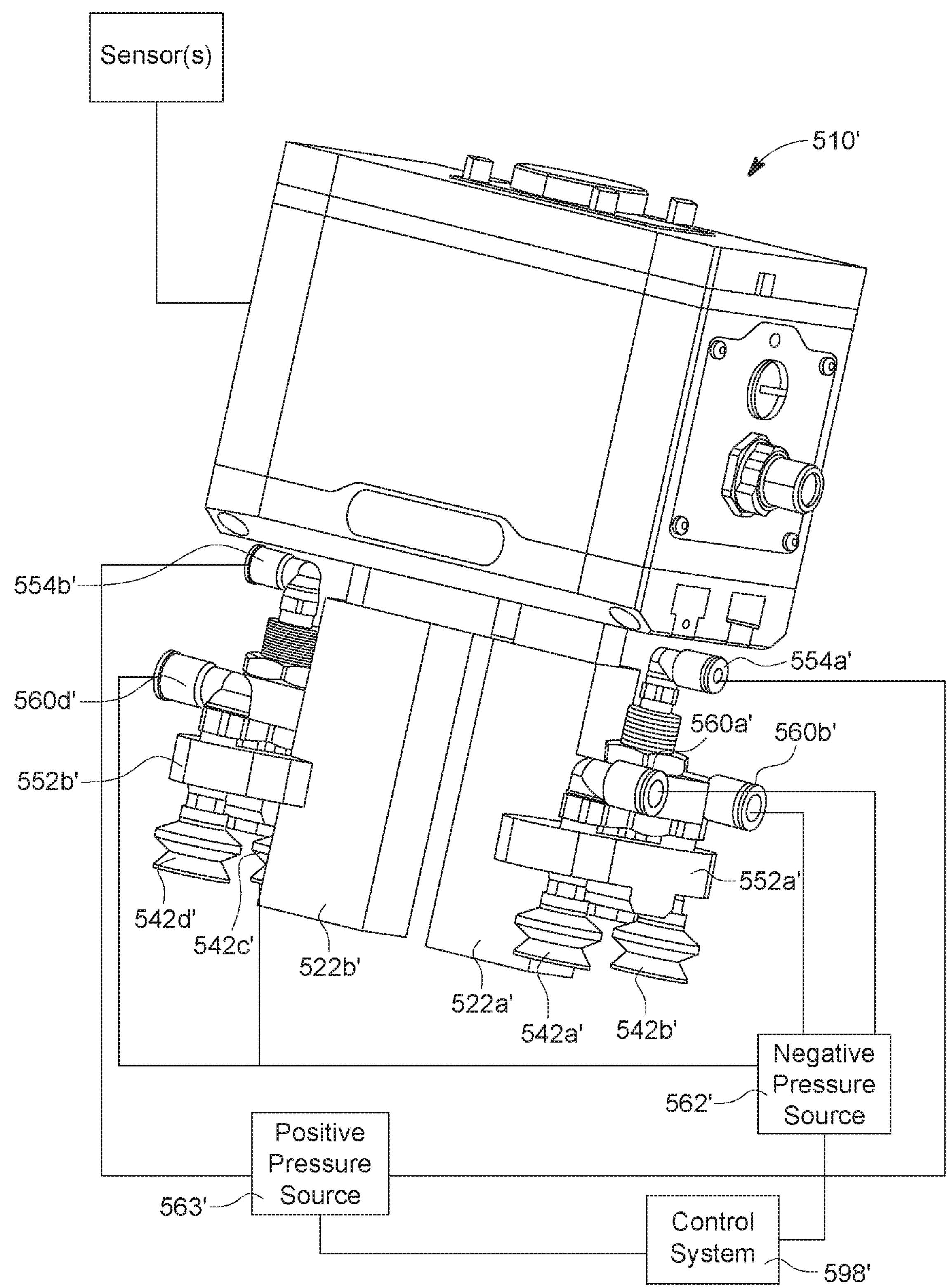
FIG. 18 illustrates a perspective view of another specific example of the multi-function robotic end-effector of FIG. 11 in accordance with an example, and showing a negative pressure system comprising one or more negative pressure generators supported at a position remote from the one or more suction assets.

With reference to FIG. 18, illustrated is the end-effector 510', which is similar to the end-effector 510 shown in FIGS. 11-17. However, in this example, instead of the end-effector 510' comprising negative pressure generators comprising a venturi vacuum system having a venturi vacuum device as in the end-effector 510 of FIGS. 11-17, the end-effector 510' comprises a negative pressure system 540' comprising one or more negative pressure generators. In one example, as shown, the negative pressure generators can comprise a plurality of negative pressure generators (e.g., see first, second, third, and fourth negative pressure generators 560*a*', 560*b*', 560*c*', and 560*d*'), each comprising a vacuum coupling in fluid communication with a negative pressure source 562', such as a vacuum pump (e.g., via one or more vacuum lines), and a suction asset, wherein the negative pressure source 562' is operable to directly induce or generate a negative pressure within the suction asset. In addition, as shown, the end-effector 510', and particularly the negative pressure system 540' can comprise a plurality of suction assets (e.g., see first, second, third, and fourth suction assets 542*a*', 542*b*', 542*c*', and 542*d*') in fluid communication with the plurality of negative pressure generators (e.g., first, second, third, and fourth negative pressure generators 560*a*', 560*b*', 560*c*', and 560*d*' negative pressure generators comprising vacuum couplings). The vacuum couplings can be mounted to a respective one of first or second mounts 552*a*' or 552*b*', which can comprise a through-hole (not shown, but similar to the through-holes in the first and second mounts 552*a*, 552*b* in the end-effector 510 of FIGS. 11-17), so as to be in fluid communication with the one or more suction assets. The end-effector 510' can further comprise first and second actuators 554*a*', 554*b*' mounted to first and second actuator supports 529*a*', 529*b*' of the first and second grippers 522*a*', 522*b*'. The first and second actuators 554*a*', 554*b*' can each be in fluid communication with one or more positive pressure sources 563' operable to supply a positive pressure to the first and second actuators 554*a*', 554*b*' to actuate the first and second actuators 554*a*', 554*b*' and displace the first and second mounts 552*a*, 552*b*, respectively, in a similar manner as set forth above in the discussion of FIGS. 11-17.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present technology.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description. Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

Although the disclosure may not expressly disclose that some examples or features described herein may be combined or interchanged with other examples or features described herein, this disclosure should be read to describe any such combinations that would be practicable by one of ordinary skill in the art no matter the specific examples that were described. Indeed, unless a certain combination of elements or functions not expressly disclosed would conflict with one another, such that the combination would render the resulting example inoperable or impracticable as would be apparent to those skilled in the art, this disclosure is meant to contemplate that any disclosed element or feature or function in any example described herein can be incorporated into any other example described herein (e.g., the elements or features or functions combined or interchanged with other elements or features or functions across examples) even though such combinations or interchange of elements or features or functions and resulting examples may not have been specifically or expressly disclosed and described. Indeed, the following examples are further illustrative of several embodiments of the present technology:

1. A multi-functional robotic end-effector, comprising:
   - a support platform;
   - a gripper assembly comprising an opposable gripper arrangement supported from the support platform and having first and second grippers, at least one of the first or second grippers being actuatable in at least one degree of freedom;
   - a negative pressure system comprising a suction asset being supported from the support platform at a position so as to be proximate the opposable gripper arrangement, the negative pressure system facilitating a negative pressure within the suction asset, wherein the suction asset extends from the support platform and comprises an object interfacing component comprising an interfacing surface that defines a suction plane.
2. The multi-functional robotic end-effector of example 1, wherein the negative pressure system further comprises a negative pressure generator in fluid communication with the suction asset and operable to generate the negative pressure within the suction asset.
3. The multi-functional robotic end-effector of any preceding example, wherein the negative pressure generator comprises a vacuum pump.
4. The multi-functional robotic end-effector of any preceding example, wherein the negative pressure generator comprises a venturi vacuum system comprising a venturi vacuum device and a positive pressure source operable to supply a motive fluid to the venturi vacuum device.
5. The multi-functional robotic end-effector of any preceding example, wherein the suction asset is positioned between the first and second grippers of the opposable gripper arrangement, and extends within a gripping region of the opposable gripper arrangement.

6. The multi-functional robotic end-effector of any preceding example, wherein the suction asset is positioned proximate one of the first or second grippers of the opposable gripper arrangement outside a gripping region of the opposable gripper arrangement.

7. The multi-functional robotic end-effector of any preceding example, wherein the suction asset is supported from one of the first or second grippers of the gripper assembly.

8. The multi-functional robotic end-effector of any preceding example, wherein the suction plane is located in a different elevation than a lowermost surface of the first and second grippers when the grippers are retracted.

9. The multi-functional robotic end-effector of any preceding example, wherein the suction plane is located in a different elevation than a lowermost surface of the support platform.

10. The multi-functional robotic end-effector of any preceding example, wherein the object interfacing component of the suction asset comprises a compliant material makeup.

11. The multi-functional robotic end-effector of any preceding example, wherein the negative pressure system further comprises a plurality of suction assets, including the suction asset, the plurality of suction assets being operable with at least one negative pressure generator.

12. The multi-functional robotic end-effector of any preceding example, wherein at least one suction asset of the plurality of suction assets is in fluid communication with at least one other suction asset of the plurality of suction assets via a manifold.

13. The multi-functional robotic end-effector of any preceding example, wherein the first and second grippers of the opposable gripper arrangement comprise a range of motion, such that the first and second grippers are retractable and positionable behind the suction plane.

14. The multi-functional robotic end-effector of any preceding example, wherein the gripper assembly comprises at least one actuator operable to actuate the at least one of the first or second grippers.

15. The multi-functional robotic end-effector of any preceding example, wherein the opposable gripper arrangement comprises a two gripper arrangement comprising the first and second opposable grippers, which in a specific example, can comprise a parallel-jaw gripper arrangement.

16. The multi-functional robotic end-effector of any preceding example, wherein the opposable gripper arrangement comprises a three gripper arrangement comprising the first and second opposable grippers at a third gripper.

17. The multi-functional robotic end-effector of any preceding example, wherein the opposable gripper arrangement comprises a four gripper arrangement comprising the first and second opposable grippers and third and fourth grippers.

18. The multi-functional robotic end-effector of any preceding example, further comprising a magnet supported by at least one of the support platform or the gripper assembly, the magnet being operable to facilitate, at least in part, the capture and manipulation of an object having at least one surface magnetically attracted to the magnet.

19. The multi-functional robotic end-effector of any preceding example, wherein the magnet is positioned within a perimeter and interior volume of the suction asset.

20. The multi-functional robotic end-effector of any preceding example, wherein the magnet comprises an air channel configured to facilitate airflow through the suction asset.

21. A multi-functional robotic end-effector, comprising:

a support platform;

a gripper assembly comprising an opposable gripper arrangement supported from the support platform and having first and second opposable grippers, at least one gripper being actuatable in at least one degree of freedom; and a negative pressure system comprising a suction asset supported from the first gripper of the gripper assembly, the negative pressure system facilitating a negative pressure within the suction asset, wherein the suction asset extends from the gripper assembly and comprises an object interfacing component comprising an interfacing surface that defines a suction plane, the suction asset being positioned outside of a gripping region of the gripper assembly.

22. The multi-functional robotic end-effector of any preceding example, wherein the negative pressure system further comprises a negative pressure generator in fluid communication with the suction asset and operable to generate the negative pressure within the suction asset.

23. The multi-functional robotic end-effector of any preceding example, wherein the negative pressure generator comprises a vacuum pump.

24. The multi-functional robotic end-effector of any preceding example, wherein the negative pressure generator comprises a venturi vacuum system comprising a venturi vacuum device in fluid communication with a positive pressure source operable to supply a motive fluid to the venturi vacuum device.

25. The multi-functional robotic end-effector of any preceding example, wherein the venturi vacuum system is supported on a component of the end-effector at a location remote from the first gripper.

26. The multi-functional robotic end-effector of any preceding example, wherein the suction asset is moveably supported from the gripper assembly, and wherein the suction asset is actuatable and positionable in multiple elevations relative to the opposable gripper arrangement.

27. The multi-functional robotic end-effector of any preceding example, further comprising a second suction asset supported from the second gripper of the gripper assembly, wherein the suction plane is defined by the first suction asset and the second suction asset.

28. The multi-functional robotic end-effector of any preceding example, wherein the negative pressure system comprises an array of suction assets supported from at least one of the first or the second grippers.

29. The multi-functional robotic end-effector of any preceding example, wherein the negative pressure system further comprises:

an actuator supported on the first gripper; and a mount coupled to the actuator, the suction asset being supported on the mount, wherein the mount and associated suction asset are displaceable relative to the first gripper in a retracted position and a deployed position via actuation of the actuator, and wherein the suction plane is positionable below a lowermost surface of the first gripper.

30. The multi-functional robotic end-effector of any preceding example, wherein the actuator comprises a single acting air cylinder with spring return in fluid communication with a positive pressure source.

31. The multi-functional robotic end-effector of any preceding example, wherein the negative pressure system further comprises a second suction asset supported on the mount.

32. The multi-functional robotic end-effector of any preceding example, wherein the negative pressure system further comprises:

a first negative pressure generator in fluid communication with the suction asset to facilitate generation of the negative pressure within the suction asset; and a second negative pressure generator in fluid communication with the second suction asset to facilitate generation of the negative pressure within the second suction asset.

33. The multi-functional robotic end-effector of any preceding example, wherein at least one of the first negative pressure generator or the second negative pressure generator are coupled to and moveable with the mount.

34. The multi-functional robotic end-effector of any preceding example, wherein at least one of the first negative pressure generator or the second negative pressure generator are supported at a location on the end-effector remote from the mount.

35. The multi-functional robotic end-effector of any preceding example, wherein the negative pressure system further comprises:

a second suction asset supported from the second gripper of the gripper assembly;

an actuator mounted to the second gripper; and a mount coupled to the actuator, the second suction asset being supported on the mount, wherein the mount and associated second suction asset are displaceable relative to the second gripper in a retracted position and a deployed position via actuation of the actuator, and wherein a suction plane defined by the second suction asset is positionable below a lowermost surface of the second gripper and outside of a gripping region of the gripper assembly.

36. The multi-functional robotic end-effector of any preceding example, wherein the negative pressure system further comprises a negative pressure generator in fluid communication with the second suction asset to facilitate generation of a negative pressure within the second suction asset.

37. A method for configuring a multi-functional robotic end-effector as in any preceding example, the method comprising:

configuring the end-effector to comprise a support platform;

configuring the end-effector to comprise a gripper assembly to be supported from the support platform, the gripper assembly comprising an opposable gripper arrangement having first and second grippers, at least one of the first or second grippers being actuatable in at least one degree of freedom; and configuring the end-effector to comprise, at least in part, a negative pressure system to be supported, at least in part, from the support platform, the negative pressure system comprising a suction asset having an object interfacing component comprising an interfacing surface that defines a suction plane, the negative pressure system facilitating a negative pressure within the suction asset.

38. The method of any preceding example, further comprising configuring the suction asset to be supported by the support platform, and positioning the suction asset within a gripping region of the gripper assembly.

39. The method of any preceding example, further comprising configuring the suction asset to be supported by the support platform, and positioning the suction asset outside of a gripping region of the gripper assembly.

40. The method of any preceding example, further comprising configuring the suction asset to be supported by the gripper assembly, and positioning the suction asset outside of a gripping region of the gripper assembly.

41. The method of any preceding example, further comprising configuring the end-effector to comprise a magnet or magnet system to be supported from the support platform.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology. Further, while advantages associated with some embodiments of the present technology have been described in the context of those embodiments, other embodiments can also exhibit such advantages, and not all embodiments need necessarily exhibit such advantages to fall within the scope of the technology. Accordingly, the disclosure and associated present technology can encompass other embodiments not expressly shown or described herein.

Moreover, unless the word "or" is expressly limited to mean only a single item exclusive from other items in reference to a list of two or more items, then the use of "or" in such a list is to be interpreted as including (a) any single item in the list, (b) all of the items in the list, or (c) any combination of the items in the list. In other words, the use of "or" in this disclosure should be understood to mean non-exclusive "or" (i.e., "and/or") unless otherwise indicated herein.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described present technology.

What is claimed is:

1. A multi-functional robotic end-effector, comprising:

a support platform;

a gripper assembly comprising an opposable gripper arrangement supported from the support platform and having first and second grippers, at least one of the first or second grippers being actuatable in at least one degree of freedom; and a negative pressure system comprising a suction asset being supported from the support platform at a position so as to be proximate the opposable gripper arrangement, the negative pressure system facilitating a negative pressure within the suction asset, wherein the suction asset extends from the support platform and comprises an object interfacing component comprising an interfacing surface that defines a suction plane, and wherein the negative pressure system further comprises a plurality of suction assets, including the suction asset, the plurality of suction assets being operable with at least one negative pressure generator.

2. The multi-functional robotic end-effector of claim 1, wherein the negative pressure system further comprises a negative pressure generator in fluid communication with the suction asset and operable to generate the negative pressure within the suction asset.

3. The multi-functional robotic end-effector of claim 2, wherein the negative pressure generator comprises a vacuum pump.

4. The multi-functional robotic end-effector of claim 2, wherein the negative pressure generator comprises a venturi vacuum system comprising a venturi vacuum device and a positive pressure source operable to supply a motive fluid to the venturi vacuum device.

5. The multi-functional robotic end-effector of claim 1, wherein the suction asset is positioned between the first and second grippers of the opposable gripper arrangement, and extends within a gripping region of the opposable gripper arrangement.

6. The multi-functional robotic end-effector of claim 1, wherein the suction asset is positioned proximate one of the first or second grippers of the opposable gripper arrangement outside a gripping region of the opposable gripper arrangement.

7. The multi-functional robotic end-effector of claim 1, wherein the suction asset is supported from one of the first or second grippers of the gripper assembly.

8. The multi-functional robotic end-effector of claim 1, wherein the suction plane is located in a different elevation than a lowermost surface of the first and second grippers when the grippers are retracted.

9. The multi-functional robotic end-effector of claim 1, wherein the suction plane is located in a different elevation than a lowermost surface of the support platform.

10. The multi-functional robotic end-effector of claim 1, wherein the object interfacing component of the suction asset comprises a compliant material makeup.

11. The multi-functional robotic end-effector of claim 1, wherein at least one suction asset of the plurality of suction assets is in fluid communication with at least one other suction asset of the plurality of suction assets via a manifold.

12. The multi-functional robotic end-effector of claim 1, wherein the first and second grippers of the opposable gripper arrangement comprise a range of motion, such that the first and second grippers are retractable and positionable behind the suction plane.

13. The multi-functional robotic end-effector of claim 1, wherein the gripper assembly comprises at least one actuator operable to actuate the at least one of the first or second grippers.

14. The multi-functional robotic end-effector of claim 1, wherein the opposable gripper arrangement comprises a two gripper arrangement comprising the first and second opposable grippers.

15. The multi-functional robotic end-effector of claim 1, wherein the opposable gripper arrangement comprises a three gripper arrangement comprising the first and second opposable grippers at a third gripper.

16. The multi-functional robotic end-effector of claim 1, wherein the opposable gripper arrangement comprises a four gripper arrangement comprising the first and second opposable grippers and third and fourth grippers.

17. The multi-functional robotic end-effector of claim 1, further comprising a magnet supported by at least one of the support platform or the gripper assembly, the magnet being operable to facilitate, at least in part, the capture and manipulation of an object having at least one surface magnetically attracted to the magnet.

18. The multi-functional robotic end-effector of claim 17, wherein the magnet is positioned within a perimeter and interior volume of the suction asset.

19. The multi-functional robotic end-effector of claim 18, wherein the magnet comprises an air channel configured to facilitate airflow through the suction asset.

20. A multi-functional robotic end-effector, comprising:

a support platform;

a gripper assembly comprising an opposable gripper arrangement supported from the support platform and having first and second opposable grippers, at least one gripper being actuatable in at least one degree of freedom; and a negative pressure system comprising a suction asset supported from the first gripper of the gripper assembly, the negative pressure system facilitating a negative pressure within the suction asset, wherein the suction asset is supported on and extends from the gripper assembly and comprises an object interfacing component comprising an interfacing surface that defines a suction plane, the suction asset being positioned outside of a gripping region of the gripper assembly.

21. The multi-functional robotic end-effector of claim 20, wherein the negative pressure system further comprises a negative pressure generator in fluid communication with the suction asset and operable to generate the negative pressure within the suction asset.

22. The multi-functional robotic end-effector of claim 21, wherein the negative pressure generator comprises a vacuum pump.

23. The multi-functional robotic end-effector of claim 21, wherein the negative pressure generator comprises a venturi vacuum system comprising a venturi vacuum device in fluid communication with a positive pressure source operable to supply a motive fluid to the venturi vacuum device.

24. The multi-functional robotic end-effector of claim 23, wherein the venturi vacuum system is supported on a component of the end-effector at a location remote from the first gripper.

25. The multi-functional robotic end-effector of claim 20, wherein the suction asset is moveably supported from the gripper assembly, and wherein the suction asset is actuatable and positionable in multiple elevations relative to the opposable gripper arrangement.

26. The multi-functional robotic end-effector of claim 20, further comprising a second suction asset supported from the second gripper of the gripper assembly, wherein the suction plane is defined by the first suction asset and the second suction asset.

27. The multi-functional robotic end-effector of claim 20, wherein the negative pressure system comprises an array of suction assets supported from at least one of the first or the second grippers.

28. The multi-functional robotic end-effector of claim 20, wherein the negative pressure system further comprises:

an actuator supported on the first gripper; and a mount coupled to the actuator, the suction asset being supported on the mount, wherein the mount and associated suction asset are displaceable relative to the first gripper in a retracted position and a deployed position via actuation of the actuator, and wherein the suction plane is positionable below a lowermost surface of the first gripper.

29. The multi-functional robotic end-effector of claim 28, wherein the actuator comprises a single acting air cylinder with spring return in fluid communication with a positive pressure source.

30. The multi-functional robotic end-effector of claim 28, wherein the negative pressure system further comprises a second suction asset supported on the mount.

31. The multi-functional robotic end-effector of claim 30, wherein the negative pressure system further comprises:

a first negative pressure generator in fluid communication with the suction asset to facilitate generation of the negative pressure within the suction asset; and a second negative pressure generator in fluid communication with the second suction asset to facilitate generation of the negative pressure within the second suction asset.

32. The multi-functional robotic end-effector of claim 31, wherein at least one of the first negative pressure generator or the second negative pressure generator are supported at a location on the end-effector remote from the mount.

33. The multi-functional robotic end-effector of claim 31, wherein at least one of the first negative pressure generator or the second negative pressure generator are coupled to and moveable with the mount.

34. The multi-functional robotic end-effector of claim 20, wherein the negative pressure system further comprises:

a second suction asset supported from the second gripper of the gripper assembly;

an actuator mounted to the second gripper; and a mount coupled to the actuator, the second suction asset being supported on the mount, wherein the mount and associated second suction asset are displaceable relative to the second gripper in a retracted position and a deployed position via actuation of the actuator, and wherein a suction plane defined by the second suction asset is positionable below a lowermost surface of the second gripper and outside of a gripping region of the gripper assembly.

35. The multi-functional robotic end-effector of claim 34, wherein the negative pressure system further comprises a negative pressure generator in fluid communication with the second suction asset to facilitate generation of a negative pressure within the second suction asset.

36. A method for configuring a multi-functional robotic end-effector, the method comprising:

configuring the end-effector to comprise a support platform;

configuring the end-effector to comprise a gripper assembly to be supported from the support platform, the gripper assembly comprising an opposable gripper arrangement having first and second grippers, at least one of the first or second grippers being actuatable in at least one degree of freedom;

configuring the end-effector to comprise, at least in part, a negative pressure system to be supported, at least in part, from the support platform, the negative pressure system comprising a suction asset having an object interfacing component comprising an interfacing surface that defines a suction plane, the negative pressure system facilitating a negative pressure within the suction asset; and configuring the end-effector to comprise a plurality of suction assets, including the suction asset, the plurality of suction assets being operable with at least one negative pressure generator.

37. The method of claim 36, further comprising configuring the suction asset to be supported by the support platform, and positioning the suction asset within a gripping region of the gripper assembly.

38. The method of claim 36, further comprising configuring the suction asset to be supported by the support platform, and positioning the suction asset outside of a gripping region of the gripper assembly.

39. The method of claim 36, further comprising configuring the suction asset to be supported by the gripper assembly, and positioning the suction asset outside of a gripping region of the gripper assembly.

40. The method of claim 36, further comprising configuring the end-effector to comprise a magnet or magnet system to be supported from the support platform.

41. A multi-functional robotic end-effector, comprising:

a support platform;

a gripper assembly comprising an opposable gripper arrangement supported from the support platform and having first and second grippers, at least one of the first or second grippers being actuatable in at least one degree of freedom; and a negative pressure system comprising a suction asset being supported from the support platform at a position so as to be proximate the opposable gripper arrangement, the negative pressure system facilitating a negative pressure within the suction asset, wherein the suction asset extends from the support platform and comprises an object interfacing component comprising an interfacing surface that defines a suction plane, wherein the negative pressure system further comprises a negative pressure generator in fluid communication with the suction asset and operable to generate the negative pressure within the suction asset, and wherein the negative pressure generator comprises a venturi vacuum system comprising a venturi vacuum device and a positive pressure source operable to supply a motive fluid to the venturi vacuum device.

42. A multi-functional robotic end-effector, comprising:

a support platform;

a gripper assembly comprising an opposable gripper arrangement supported from the support platform and having first and second grippers, at least one of the first or second grippers being actuatable in at least one degree of freedom; and a negative pressure system comprising a suction asset being supported from the support platform at a position so as to be proximate the opposable gripper arrangement, the negative pressure system facilitating a negative pressure within the suction asset, wherein the suction asset extends from the support platform and comprises an object interfacing component comprising an interfacing surface that defines a suction plane; and a magnet supported by at least one of the support platform or the gripper assembly, the magnet being operable to facilitate, at least in part, the capture and manipulation of an object having at least one surface magnetically attracted to the magnet.

* * * * *